(12) United States Patent
Quintana

(10) Patent No.: US 10,690,556 B1
(45) Date of Patent: Jun. 23, 2020

(54) SPEED DRIVEN METHOD FOR CALCULATING TORQUE, POWER AND ENERGY EFFICIENCY IN THE CONTROL, HEALTH ASSESSMENT AND MAINTENANCE OF ROTATING EQUIPMENT AND TURBO MACHINERY

(71) Applicant: Mauricio F. Quintana, Glastonbury, CT (US)

(72) Inventor: Mauricio F. Quintana, Glastonbury, CT (US)

( * ) Notice: Subject to any disclaimer, the term of this patent is extended or adjusted under 35 U.S.C. 154(b) by 18 days.

(21) Appl. No.: 16/259,801

(22) Filed: Jan. 28, 2019

(51) Int. Cl.
*G01L 3/26* (2006.01)
*G01L 5/00* (2006.01)
*H02H 7/08* (2006.01)
*H02H 1/00* (2006.01)

(52) U.S. Cl.
CPC .......... *G01L 3/26* (2013.01); *G01L 5/0061* (2013.01); *H02H 1/0007* (2013.01); *H02H 7/0833* (2013.01)

(58) Field of Classification Search
CPC ..... G01L 3/26; G01L 5/00; G01L 1/00; G01L 25/00; H02H 7/00
See application file for complete search history.

(56) References Cited

U.S. PATENT DOCUMENTS

| 2,795,131 | A | | 6/1957 | Booth | |
|---|---|---|---|---|---|
| 3,340,729 | A | | 9/1967 | Scoppe | |
| 3,905,223 | A | * | 9/1975 | Ludloff | G01L 3/24 73/65.07 |
| 4,899,598 | A | | 2/1990 | Gumaste et al. | |
| 5,018,392 | A | * | 5/1991 | Mercat | G01L 25/003 73/862.191 |
| 6,128,964 | A | | 10/2000 | Sobel | |
| 7,886,863 | B2 | | 2/2011 | Marsh et al. | |
| 10,444,119 | B2 | * | 10/2019 | Engstrom | G01M 13/025 |

\* cited by examiner

*Primary Examiner* — Eduardo Colon Santana
*Assistant Examiner* — Said Bouziane
(74) *Attorney, Agent, or Firm* — Mary J. Gaskin

(57) ABSTRACT

Method for measuring torque in rotating-equipment, turbo-machinery, pumps, turbines, and compressors. The measured torque can be used as an input to control torque, power, or energy efficiency. The method can also measure force (or torque) in traversing-machinery or vehicles such as automobiles, ships, aircraft, bicycles and motorcycles. The method takes real-time rotating (or linear) speed measurements, applies the discrete form of equations of motion, captures the natural decay curve(s) of the machine to estimate the torque (or force) associated with the losses of the power sink, and then solves for the driving torque of the power source. The method relates to monitoring and control systems used to safely and efficiently operate rotating-equipment and traversing-machinery. The method can be used to determine a health index of a machine to make predictive and corrective maintenance, reliability, performance, safety, and efficiency-related decisions. It is accurate, robust, lightweight, space-saving, and low cost.

26 Claims, 6 Drawing Sheets

SPEED DRIVEN METHOD FOR CALCULATING TORQUE, POWER AND ENERGY EFFICIENCY IN THE CONTROL, HEALTH ASSESSMENT AND MAINTENANCE OF ROTATING EQUIPMENT AND TURBO MACHINERY

FIELD OF THE INVENTION

The present invention relates to a method for measuring torque in rotating equipment, including turbo machinery, for both steady and unsteady state conditions, where the measured torque can be used as an input to control torque and/or maximize energy efficiency. The method is mainly based on taking real-time rotating (or linear) speed measurements and applying the discrete form of the equations of motion, where the natural decay curves of the rotating machine are used to estimate the torque associated with the losses of the power sink and then used to solve for the driving torque of the power source. The method can be used to measure the mechanical load on a shaft in rotating equipment like turbo machinery, which includes fans, pumps, gas turbines, aero turbines, wind turbines, reciprocating engines, hydro turbines, steam turbines, helicopter fans, marine propulsion and gas compressors, along with auxiliary equipment attached to them, including electric generators, energy storage devices, gear boxes, and other process equipment across many industries, including manufacturing, transportation (air, land and sea), power generation and military applications. The method of the present invention can be used in bicycles, motorcycles, automobiles, aircraft, and watercraft. The method of the present invention also relates to monitoring and control systems used to safely and efficiently operate rotating equipment in the fields mentioned above. The method can be used to determine the health index of a rotating machine to make predictive and/or corrective maintenance decisions and take repair, reliability, performance and/or efficiency improvement related actions.

BACKGROUND OF THE INVENTION

Torque meters, sometimes referred to as power meters, have long been used to determine mechanical loads on rotating shafts in turbo machinery. By determining torque, the operator of the equipment can determine if the equipment is performing within its material strength limits, and, if combined with the rotating speed of the system, the energy the system is consuming or delivering per unit of time (power) can be determined. Power (in Watts) is defined as the multiplication of torque (in N*m) and rotational speed (in rad/s). Measuring the speed of a shaft is straightforward with the use of standard speed measurement devices (tachometers) that measure rotational speed in Hertz (rad/s) or revolutions per minute (rpm). Different technologies are widely available to measure rotating speed, and it is common practice to measure the speed of turbo machinery as a means to monitor the "health" of the equipment for product performance and maintenance purposes. With known torque and speed variables, the power captured or consumed by turbo machinery can be determined. This enables the continuous monitoring of the efficiency of the equipment, where efficiency is defined as the ratio of power (or energy) output over power (or energy) input. This type of health monitoring can provide turbo machinery operators the ability to continuously monitor the performance of the equipment based on real-time data (rather than predictive/error-prone methods) and take proactive actions to recondition equipment to address performance degradation and/or avoid costly or fatal failures. Despite the benefits, measuring the torque of turbo machinery in field installations has been an elusive goal. The existing techniques used to measure torque in rotating equipment are either too costly, or heavy, or impractical, or are not robust enough to withstand the challenges in the field.

Several methodologies exist today to measure torque. Some relate to static torque measurements that apply to non-rotating components, and some refer to dynamic torque measurements that apply to rotating equipment, which are of greater concern in turbo machinery and, therefore, the focus of the method of the present invention. The techniques to measure dynamic torque include the following: (a) installing strain gauges on the surface of the shaft in a Wheatstone bridge circuit configuration; (b) using a torque transducer that is directly coupled to the shaft; or (c) using optical torque measurement techniques. These techniques are described in the following paragraphs.

Strain Gauges:

Strain gauges are usually placed on the surface of the shaft and, as the shaft deforms due to the applied torque (sometimes referred to as mechanical load), the strain gauges also deform, which changes the electrical resistance of the strain gauge, which, in turn, causes a change in voltage that is proportional to the strain or mechanical deformation in the surface of the shaft. Strain (measured in m) is directly proportional to the mechanical stress (measured in $N/m^2$) if the material is within its elastic limit according to Hooke's law. Then, if the shaft dimensions are known, the amount of torque applied to the shaft can be determined. This technique assumes that the shaft material properties (including type of material, modulus of elasticity, etc.) are known and that the relationship between torque and stress is also known. In most cases, the material behaves elastically, but, as the material moves towards non-elastic behavior, the use of these techniques becomes subject to larger measurement errors. If the material is made from a non-elastic type, such as plastic, then the relationship between torque and stress/strain becomes less predictable.

Moreover, to install the strain gauges on a shaft, several electric connectors (wires) are needed to connect the strain gauge Wheatstone bridge circuit to a data acquisition system. These types of arrangements are cumbersome, not very robust and can be easily broken during use, especially if the shaft is rotating. Therefore, strain gauge measurement methods are typically limited to static load laboratory tests, where a non-rotating shaft of known dimensions is subjected to a known or unknown torque load, and the amount of stress is then calculated based on the deformation (strain) read from the strain gauges. Furthermore, strain gauge measurements typically require several strain gauges to be installed in order to have redundant readings, since strain gauges are also susceptible to temperature changes due to thermal expansion in the base material, along with vibrations and other noise. This redundancy adds to the complexity of the strain gauge installation and limits their use to non-commercial/field installations.

Torque Transducer.

Dynamic torque can be measured by directly coupling a torque transducer on a rotating shaft. Transducers typically include a load cell, which is also built using strain gauges. The main issue with these torque meters is that they are costly and sensitive pieces of equipment susceptive to failure when exposed to excess loads, vibration or thermal expansion. These factors limit their use to small scale, lab-type applications, with limited deployment in the field.

Optical Torque Measurement Devices.

Optical torque measurement devices include those devices where a shaft insert (torque meter) of predetermined characteristics is placed inline with the main shaft of the equipment subjected to dynamic torque. As the torque meter suffers angular deflections, these deflections can be measured optically/electronically by using lasers that indicate the amount of angular deformation; this angular deformation is, in turn, directly proportional to the applied torque.

In summary, current static and dynamic torque measurement devices and methods rely on some form of measurement of the mechanical deformation on either the actual main shaft of the equipment, as in the case of strain gauges, or the mechanical deflection of an element attached directly to the main shaft (transducers). These methods have proven to be accurate in controlled environments, but they have proven to be too costly, fragile or heavy to be deployed in actual commercial installations. These limitations inspired this inventor to develop a new and robust method to measure dynamic torque in commercial/field installations of turbo machinery, one which enables measuring real-time efficiency and improved health monitoring.

The present invention is a method that calculates the dynamic torque by applying dynamic principles, measuring two main state variables (speed and time) on a real-time basis, in combination with the inertia of the system, and torque associated with non-conservative forces which was measured previously, during the natural decay of the system in similar operating conditions. The estimated torque the method produces can be used to monitor or control the speed of the system to keep the equipment within its structural limits of performance, to extend the life of the equipment, and to optimize the system to maximize energy efficiency on a real-time basis. Therefore, this method not only overcomes the limitations described earlier of current technologies, which base their torque measurements on material deflections, but it also enables the optimized use of turbo machinery and rotating process equipment on a real-time basis. Finally, because of its simplicity, the proposed invention can be used in new or existing (as a retrofit) turbo machinery and rotating equipment.

No prior art was found that used rotational speed to calculate torque in both steady state (constant speed) and unsteady state (varying speed) conditions, based on the use of Newton equations of motion (as shown in equation 1, infra) and by incorporating values of the non-conservative forces (or conservative torques) calculated during the natural decay of the system and stored for later use, to calculate the torque of the system on a real-time basis in similar speed and operating conditions. The method proposed can be used with a large variety of rotating equipment and turbo machinery.

The prior art involving a method that use rotational speed, directly or indirectly, to estimate or set a target torque includes U.S. Pat. No. 9,014,861 to Attia, in which the invention relates to a method to control noise in wind turbines, where wind speed readings lead to a target rotational speed and, consequently, a target torque and target pitch of the wind turbine blades. However Attia only applies to wind turbines, and it cannot be applied generally to rotating machinery other than a wind turbine, whereas the method of the present invention overcomes these limitations. Further, Attia does not use the Newton equations of motion or data taken from the natural decay of the system to calculate torque on a real-time basis. The method of the present invention does use Newton's equations of motion, real-time rotational speed measurements and data taken from the natural decay of the system to calculate the torque that is being applied to a rotating machine.

Another reference, U.S. Pat. No. 7,352,075 to Willey, et al., teaches a method to control the rotating speed and rotor torque based on controlling the torque in the generator of a wind turbine. Willey shows a graphical relationship between wind speed, rotor rpm and power output from the wind turbine, but it fails to teach specifically how rotational speed can be used to derive the applied torque; it does show how the wind speed and rotational speed can be used to set a target torque in the electrical generator and, therefore, determine the required blade pitch. Like Attia, the Willey reference is specific to wind turbines, and it does not apply generally to rotating equipment, as does the present invention.

SUMMARY OF THE INVENTION

The present invention teaches a method to calculate torque in rotating equipment (including turbo machinery), from which power and energy efficiency can be derived. The method is applicable in both steady state and non-steady state conditions, to monitor and enable the control and safe operation of rotating equipment, thereby enabling higher reliability, an extended service life and optimized energy consumption of rotating machines. The method of the proposed invention calculates the torque applied to a shaft of a rotating machine by taking real-time rotating speed measurements, and data taken from the natural decay of the system (FIG. 2, infra) under similar speed and operating conditions and applied to a discreet version of the equation of motion of the rotating machine, according to Newton's laws of motion. Once the torque is calculated and the rotating speed of the shaft is measured, then the power being transmitted by the shaft can be determined (power is defined as the product of torque and rotating speed), and, once, the power losses from non-conservative forces are calculated, the efficiency of the system is determined. The method can be applied generally to all rotating equipment, with certain limitations related to sampling rates, the presence of lateral/eccentric loads that can change the friction in the bearings of the shaft when under load, and the ability to filter real-time data. By narrowing the problem to mainly taking speed measurements, the method of the present invention overcomes the limitations of traditional methods or systems to calculate the applied torque on a rotating shaft, such as the use of traditional torque meters that estimate torque by measuring shaft deformations. As noted supra, traditional torque meters are not appropriate for real-time, in-the-field, and commercial uses, because of reliability issues and the cost of such devices.

The equation of motion of a shaft subject to a driving torque and losses due to friction, drag, etc., with a given moment of inertia (constant or variable), is as follows:

$$T_{IN} - T_{LOSS} = T_N = I * dW/dt \qquad \text{(Equation 1)},$$

wherein $T_{IN}$ (in Newton*m) is the driving torque (from an electric motor, turbine, reciprocating engine, power source, etc.), $T_{LOSS}$, the power sink, (in Newton*m) is the negative torque due to losses (friction, drag, etc.) and/or other sources opposing the rotation of the shaft, $T_N$ (in Newton*m) is the torque net of losses and/or sources opposing the rotation and acting on a shaft (net of irreversibilities due to non-conservative forces), I ($kg*m^2$) is the given moment of inertia of the system, W (Rad/s) is the angular speed of the system, and, finally, dW/dt (Rad/s2) represents the angular acceleration of the system. Equation 1 is represented in the free-body diagram of FIG. 1, infra. During transient states, when speed is changing, one could measure the torque net of losses $T_N$ by taking speed measurements on a real-time basis. However, this approach would not yield the true and, therefore, maximum torque applied $T_{IN}$ because it does not account for the losses $T_{LOSS}$ in the system, which makes it inadequate to measure/control the torque, power or energy conversion efficiency of the system. In steady state conditions, equation 1 also remains indeterminate, with more than one unknown variable, since, again, $T_{LOSS}$ remains unknown. The moment of inertia I (kg*m$^2$) in equation 1 can either be provided by the manufacturer of the equipment, or an engineer can readily calculate it using traditional engineering principles. It is worth noting that the moment of inertia is specific to an axis of rotation, and it depends on the geometry and distribution of the mass about the axis of rotation; the moment of inertia can be constant or it can be variable depending if the distribution of the mass(es) about the rotating axis varies with rotational speed or over time. (Note: although not shown in equation 1, when the system is affected by gravity or other conservative forces, the torque resulting from this force needs to added to the left side of equation 1, with a sign that is either positive or negative depending whether gravity is in favor or opposing to the direction of rotation of the shaft.)

To solve equation 1, which has two unknowns ($T_{IN}$ and $T_{LOSS}$), it is assumed that the moment of inertia I is known or can be determined, and that the angular acceleration dW/dt can be measured and, thus, is also known. This implies that we need another equation that relates $T_{IN}$ and $T_{LOSS}$. Further inspection of equation 1 yields the non-obvious insights that form the basis of the method proposed by the present invention. To extract these insights lets show equation 1 in steady state, i.e., when the system is rotating at a constant speed, which implies dW/dt=0.

$T_{IN} - T_{LOSS} = 0$; for W=constant      Equation 1A $T_{IN} = T_{LOSS}$; for W=constant      Equation 1 B A close inspection of equation 1B indicates that at a given speed, in steady state, the value of $T_{LOSS}$ and, therefore, $T_{IN}$, will generally depend on the constant speed W the shaft is rotating in equilibrium, i.e., the speed at which the system is rotating at a specific steady state condition. Said differently, in steady state conditions, the rotating machine converges on an equilibrium state, where the value of the driving torque $T_{IN}$ and the torque due to losses $T_{LOSS}$, are equal, and will depend on the value of the rotating speed W for the particular steady state condition. This means that we can rewrite equation 1 B as follows, to reflect the dependency of $T_{IN}$ and $T_{LOSS}$, on speed W:

$T_{IN}(W) = T_{LOSS}(W)$; for W=constant      Equation 1C

The question then becomes how to estimate the value of $T_{LOSS}(W)$. One option is to use a theoretical approach, where drag forces associated with $T_{LOSS}$ can be calculated using standard engineering principles, where drag is proportional to $K*\frac{1}{2}*V^2$; where K is a drag coefficient factor that depends on the type fluid, geometry of the device and speed of the device in the fluid (turbulent vs. laminar flow), etc.; and where V relates to the linear speed of the device in the fluid.

Other components of $T_{LOSS}$ can include friction, like that between a tire and a road, which will depend on a friction coefficient and the normal force between the device and the surface with friction, etc. In most cases, the normal force between the device and the friction surface does not depend on speed, but, in some cases, these normal forces, which can also be present in bearings of a rotating shaft in the form of lateral/asymmetric forces on the shaft, may depend on rotating speeds. For example, in the case of a wind turbine, the higher the speed of the rotor, the higher the lateral loads on the main bearings, which in turn increase the friction in the bearings.

Other components in $T_{LOSS}$ can include elements that are harder to extract from mathematical models, for example, in the case of a mixer, where the blade of the mixer rotates in a medium that may not behave as a Newtonian fluid, so that its behavior becomes difficult to predict with mathematical models (e.g., paint, where its viscosity changes with rotational speed). In some cases, a theoretical formulation of $T_{LOSS}$ is possible with fairly accurate results. However, the use of theoretical models is limited, and an experimental approach that better captures the reality of how and where the device is being used would more generally and accurately predict $T_{LOSS}$, as a function of speed W.

In order to formulate the method, we first make the assumption that $T_{LOSS}$ is independent of $T_{IN}$ in equations 1, 1A, 1B and 1C. In other words, the torque associated with the losses $T_{LOSS}$ due to non-conservative forces is not dependent on the driving torque $T_{IN}$, and, from equation 1C, it depends solely on the rotational speed W. This is not true in the case where a rotating shaft is subject to varying lateral forces due to eccentric loads, since the lateral forces may increase the normal force between the bearing(s) and the shaft, increasing friction (FIG. 3, infra.) In such cases, $T_{LOSS}$ is not only dependent on speed and an estimation error is introduced. The magnitude of the estimation error requires careful evaluation of the application and of the free body diagram depicting external forces acting on the system. Generally speaking, in most cases, the error introduced is generally small or insignificant. Furthermore, in cases where gravity or air density play a role in equation 1, in addition to speed, other variables may need to be measured, like inclination and altitude, if these factors vary during normal operating conditions in which the system is used.

To find an experimental method that yields $T_{LOSS}$ (W), we rewrite equation 1 for the case when the driving torque $T_{IN}$ is removed ($T_{IN}=0$) and the system that is rotating at a certain initial speed is allowed to enter natural decay until it comes to a complete stop, according to:

$T_{LOSS}(W) = -I*dW/dt$(natural decay)      Equation 2

This equation can be rewritten in discrete form as:

$T_{LOSS}(W_{avg})_{natural\text{-}decay} = -I*(W_{t+\Delta t} - W_t)/\Delta t$ (natural decay)      Equation 3

Where I (kg*m$^2$) is the moment of inertia of the system, $\Delta t$ (s) Is the sampling rate of the speed measurements, $W_t$ (rad/s) is the measured rotating speed at time=t, $W_{t+\Delta t}$(rad/s) is the measured rotating speed at time=(t+$\Delta t$), and $W_{avg}$ is the average speed between the measured speed values $W_t$ (rad/s) and $W_{t+\Delta t}$ (rad/s), i.e., $W_{avg}$ equals $(W_t+W_{t+\Delta t})/2$. Equation 3 reduces the problem of measuring $T_{LOSS}$ ($W_{avg}$) to simply taking discrete measurements of rotational speed every $\Delta t$, where $\Delta t$ is in the order of a few milliseconds if off-the-shelf, commercially available, tachometers are used. The values of $T_{LOSS}$ ($W_{avg}$) taken from the natural decay are then captured and stored electronically with the use of a computer and software/algorithm combination, to be later used to calculate the driving torque $T_{IN}$ in equation 1. Therefore, the method of the present invention teaches that the results of equation (3) can be used to solve for $T_{IN}$ in equation 1C, when the system is in a steady state condition, or to solve for $T_{IN}$ in equation 1, for non-steady state conditions.

The negative sign in equation (3) is canceled by the negative value of the expression ($W_{t+\Delta t} - W_t$), since in natural decay, the system decelerates due to non-conservative (irreversible) forces. Therefore, the value of $T_{LOSS}$ ($W_{avg}$), although opposing to the direction the system rotates, is greater than zero. Finally, it is worth noting that, from equation 1C, in steady state conditions where speed W is constant, the value of $T_{IN}$ (W) depends on the value of speed W at a given steady state. So when the system is in natural decay according to equations 2 and 3, the system decelerates, and different values of $T_{LOSS}$ ($W_{avg}$) are measured, which typically implies an exponential decay, that asymptotically approaches zero speed.

During this deceleration, when the only external torque acting on the system is $T_{LOSS}$ (W), the system traverses through a series of steady state conditions ranging from the initial speed (or maximum speed), when the system started the natural decay, to zero speed, when the system comes to a stop, as per equation 1C. This unobvious observation is the foundation for the method proposed in the present invention. Its worth noting that, as the system approaches zero speed, friction coefficients (p) that vary significantly between static (no movement) and kinetic (when there is movement), enter a zone where the kinetic friction coefficient may vary with speed as it transitions between kinetic to static values; this may introduce errors at low speeds. In general, $\mu_{static} \gg \mu_{kinetic}$, which explains why it takes greater effort to initiate the movement of a body than to accelerate it, once it is in motion. However, as the body transitions from static to dynamic motion, the effects of the static and dynamic coefficients of friction on $T_{LOSS}$ tend to overlap al low speeds, which makes this transition more difficult to predict analytically.

By solving for $T_{IN}$ in the discrete form of equation 1 we have:

$$T_{IN}(W_{avg}) = T_{LOSS}(W_{avg})_{natural-decay} + I^*(W_{t+\Delta t} - W_t)/\Delta t \quad \text{Equation 4}$$

Equation 4 summarizes the proposed method of the present invention, where the measurement of the driving torque $T_{IN}$ at a speed $W_{avg}$, is approximately equal to the sum of the values $T_{LOSS}$ ($W_{avg}$), previously measured and stored electronically (via a computer and software) during the natural decay of the system and the product of the moment of inertia of the system by the angular acceleration of the system, where the angular acceleration of the system is measured on a real-time basis by taking rotating speed measurements $W_t$, $W_{t+\Delta t}$ in specific time intervals $\Delta t$ and as defined earlier, $W_{avg}$, is the average speed between $W_t$ and $W_{t+\Delta t}$. Equation 4 was verified by conducting experiments where the torque was measured both by using a torque meter and as depicted by equation 4; the results were virtually identical (see FIG. 8, infra). It is worth noting that, in case that gravity affects the rotation of the shaft depicted in equation 4, the corresponding gravity component of torque (a conservative force) would need to be added or subtracted from the right side of equation 4, if it is in favor or opposing the rotation of the shaft. Similarly, if elevation changes are significant and air drag is a relevant component of $T_{LOSS}$, then $T_{LOSS}$ in equation 4 needs to be corrected for air density changes, depending on the application. The details of such corrections are not explicitly noted since a person skilled in the art of mechanical engineering, would readily determine the corrections needed. However, for clarity, a few additional comments follow.

For devices that are affected by gravity:
A. If a device is affected by gravity (or inclination), then equation 4, which assumes a $T_{LOSS}$ that was determined in a flat surface, must be corrected. This correction can be analytical or experimental.
B. In case of an analytical correction, which applies to cases that have a constant or varying inclination, because gravity is a conservative force (as mentioned earlier) the gravitational component of torque must be added to the right side of equation 4; this component will have a positive or negative sign (on the right side of equation 4), if gravity is against or in favor of the direction of motion respectively. The analytical correction does require that the mass of the device and the inclination at which it operates be determined. This analytical correction is preferred over an experimental one, since it introduces fewer measurement errors and can leverage the $T_{LOSS}$ curve previously determined in natural decay over a flat surface. If the device is operating in a constant inclination (not in a flat surface and assuming mass is also constant), then the effect of gravity is constant and inclination only needs to be calculated once (i.e., real-time measurement not required) to correct equation 4 analytically.
C. If the value of inclination is constant, the effect of gravity can also be determined experimentally. This is done by determining $T_{LOSS}$ (through natural decay), in a setting that has the same inclination (slope) at which the device will operate, in which case the value of $T_{LOSS}$ would already contemplate the effect of gravity (in natural decay), and equation 4 would not need to be corrected. This method introduces more measurement errors, but it has the advantage that it does not need to explicitly determine the mass of the device or the inclination at which the device will operate; it only needs to conduct the natural decay $T_{LOSS}$ determination process in similar operating conditions.
D. Finally, if the inclination under which the device operates, varies over time, then, in addition to having to correct equation 4 for the effect of gravity, a new variable, in this case, inclination, would need to be measured on a real-time basis, together with speed. For such circumstances, it is better to correct equation 4 analytically to achieve the most accurate results.

For devices that are affected by altitude, the following is worth mentioning:
A. Correcting the effect of altitude in $T_{LOSS}$ analytically in equation 4 is difficult at best. Assuming $T_{LOSS}$ is determined in a flat surface (with no gravitational effect), the value of $T_{LOSS}$ is the linear sum of the effect of friction and drag. Friction, as noted earlier, is largely independent of speed (except in low speeds), while drag varies to the square of speed (highly dependent on speed) and proportionally to the value of the density of the fluid, in the case of air, to altitude.
B. In order to make altitude corrections to equation 4 analytically, the friction component of torque (or force) would need to be estimated analytically, by making assumptions on the coefficient of friction and by estimating the normal force acting on the surface generating the friction. Then, the estimated torque due to friction would be subtracted from the existing values of $T_{LOSS}$ to isolate the drag component in $T_{LOSS}$, which in turn can then be corrected for the effect of altitude, as a multiplication factor equal to the ratio of the current air density (at a given altitude) over the air density at which $T_{LOSS}$ was originally determined. Once the drag component has been isolated and corrected for change in altitude, then a new value of $T_{LOSS}$ is calculated as the sum of the estimated friction and corrected drag. This new value of $T_{LOSS}$ is then used in equation 4. Therefore, to the extent the effect of friction can be estimated in an accurate way, an analytical correction for altitude is viable, but it is impractical in cases where the altitude is not constant and continuously changing.

C. The more pragmatic approach to correcting for changing altitude, is to conduct the natural decay process for $T_{LOSS}$ in two extreme altitudes, one at sea level and the other at a maximum expected altitude level, and then interpolate between the two extreme values of altitude, since density varies linearly with altitude. The interpolation would be performed with the help of software and a computer. It is worth noting that these two extreme $T_{LOSS}$ curves will include the same amount of friction, and, if both curves are subtracted, the result isolates and shows how drag varies with speed and altitude. As was the case with gravity, if the device operates in a constant elevation, the $T_{LOSS}$ curve needs to be determined at the elevation at which the device will operate to avoid further corrections to equation.

D. If elevation varies over time and the device is affected by changes in elevation, then elevation or density needs to be measured on a real-time basis, and the corrections stated above need to be made.

The method of the present invention greatly simplifies the measurement of dynamic torque, particularly since it no longer depends on measuring mechanical deformation on the shaft or on a transducer. The method also enables the ability to calculate the power supplied by the prime mover as the multiplication of the $T_{IN}$ by the rotational speed, and the power consumed by the power sink as the multiplication of the $T_{LOSS}$ by the rotating speed. With the power supplied by the prime mover and the power consumed by the power sink known, the efficiency of the system can be determined as the ratio of the difference between the power of the source and the power sink, divided by the power of the source. In the case of a wind turbine, where the power source is the kinetic energy in the wind at a given wind speed (measured with anemometers on the wind turbine), the method enables the ability to calculate the energy conversion efficiency of a wind turbine (and its rotor), which today is only estimated, but not measured on a real-time basis. Examples of applications are detailed infra.

The proposed method of the present invention does not add mass/weight, so it is particularly interesting in applications that are space or weight constrained. The method involves gathering and processing large amounts of data on a real-time basis, so proper filtering techniques are needed to manage noise or variance in the data measured. These filtering techniques include the use of Kalman filters, polynomial regression methods, averaging, interpolation and extrapolation techniques, that are of common knowledge to those skilled in the art of signal and data processing.

It is worth noting that, in certain cases, the prime mover responsible for delivering $T_{IN}$ in equation 1 may involve a gearbox, where the sequence of gears used in the operation of the system vary over time (i.e., there is shifting of gears). If the system is a direct drive type (i.e., no gearbox) or if a fixed gear type (no shifting of gears in the gearbox), the use of equation 1 is straightforward. However, in systems with a gear box, where gears are shifting and the system is traversing as in the case of a vehicle (e.g., an automobile, motorcycle or bicycle), it is easier to apply the proposed method by using the linear form of equation 1, where forces and linear acceleration substitute for torques and angular acceleration, and mass replaces the moment of inertia in equation 1. The reason is that, otherwise, the method would ultimately require measuring the gear ratio to estimate the power of the source.

The linear version of equation 1 (see FIG. 5, infra) would be:

$$F_{IN} - F_{LOSS} +/- F_G = F_N = M * dV/dt \quad \text{Equation 5.}$$

$F_{IN}$ (N) is the driving force from the power source, $F_{LOSS}$ (N) are the non-conservative forces from the power sink (sum of friction, drag, etc.), $F_G$ (N) is the component of the force of gravity affecting the motion (positive or negative depending on whether it is in the direction or opposing the direction of motion), $F_N$ (N) is the driving force net of losses and gravity, M is the mass of the system (vehicle), V (m/s) is the linear speed of the system and, finally, $dV/dt$ (m/s$^2$) represents the linear acceleration of the system.

Equation 5 can be rewritten in discreet form while solving for $F_{IN}$ as:

$$F_{IN}(V_{avg}) = F_{LOSS}(V_{avg})_{natural-decay} -/+ F_G + I^* (V_{t+\Delta t} - V_t)/\Delta t \quad \text{Equation 6,}$$

where the measurement of the driving force $F_{IN}$, at an average speed $V_{avg}$, is approximately equal to the sum of the values $F_{LOSS}$ (W), previously measured and stored electronically (via a computer and software) during natural decay of the system and the force of gravity $F_G$ and the product of the mass of the system by the linear acceleration of the system, where the linear acceleration of the system is measured on a real-time basis by taking linear speed measurements $V_t$, $V_{t+\Delta t}$ in specific time intervals $\Delta t$, and where $V_{avg}$, is the average speed between $V_t$ and $V_{t+\Delta t}$. To measure the linear speed, there are a few options, including using devices with GPS capabilities (like a cellular/smart phone) or by using a tachometer on a wheel of the system with a known diameter to calculate the linear speed of the wheel or by using a pitot tube, where dynamic pressure is measured with a pressure transducer. The inclination of the vehicle would also be needed to calculate the component of $F_G$ along the direction the vehicle/system is traveling. To measure the inclination requires the use of a digital or analog inclination sensor, where the signal is ultimately converted to a value that can be used in the method proposed by the current invention. Some smart phones incorporate inclination-sensing capabilities, making such devices a convenient way to implement the proposed method. Further, in certain cases where air drag is a consideration, altitude also needs to be measured in order to correct the natural decay curve for $F_{LOSS}$ to changes in air density due to relevant changes in elevation (as described earlier); in this case, an altimeter or a device that incorporates an altitude sensor would be needed.

For completeness, during natural decay, when $F_{IN}=0$, equation 6 can be rewritten as follows, solving for $F_{LOSS}$:

$$F_{LOSS}(V_{avg})_{natural-decay} = -I^*(V_{t+\Delta t} - V_t)/\Delta t \text{(natural decay),} \quad \text{Equation 7}$$

which is equivalent to equation 3 in angular form and where $F_{LOSS}(V_{avg})_{natural-decay}$ from equation 7, is used in equation 6. It is worth noting that the gravity component $F_G$ in equation 6 is excluded in equation 7, because $F_G$ is a conservative force and, while it may play a role in natural decay, it is assumed that equation 7 is used in conditions where the system is neutral to gravity. The effect of gravity can always be added afterwards by using the principle of linear superposition, as long as the mass, acceleration due to gravity, and inclination of the system/vehicle are known. It is worth mentioning that, if the inclination is constant, the natural decay curve could be obtained in the inclined surface, which would already contemplate the effect of gravity.

The method of the present invention, as mentioned, can be used to assess the health of a rotating machine. This is done by comparing natural decay curves as shown in FIG. 2 after a certain number of hours of operation (or number of cycles), where a shift towards the left of the natural decay portion of the curve would be reflected as a natural decay curve with a higher slope, in other words, the system would reach zero speed in less time, possibly indicating higher friction in bearings due to malfunction or wear. Fatigue is a key consideration in the design of rotating equipment. Some devices are designed for infinite life, while others are not, either because of cost or weight considerations, e.g., aluminum shafts have a finite fatigue life. To measure the operating cycles associated with fatigue, the hours of operation of the machine, together with the speed at which it rotates, need to be measured. In addition, the mechanical load on the main shaft needs to be determined in order to calculate the mechanical stress of the rotating shaft, which, coupled with the number of cycles, can help determine how much of the fatigue life is left or has been used. It should be noted that the torque estimated from the method of the present invention would be used as input in order to calculate the structural stress on the shaft, which depends on the material, diameter, and specific shape of the shaft.

The method of the present invention can be divided in two key parts: a preparatory stage and the steps needed for the practical use and implementation of the method.

The preparatory stage of the proposed method involves and assumes the following:

A. Prepare a free-body diagram of the system depicting all external forces (torques) acting on it (see FIG. 1 and FIG. 5 infra); if lateral forces act on the driving shaft (see FIG. 3 infra) in a way that they vary randomly during load, this can affect the accuracy of the natural decay curves in steps 1a to 1g below, since the curves would not be consistent in similar operating conditions.

B. Prepare the detailed equation of motion of the system (Equations 1 and 5 are general in nature), which requires someone skilled in the art of mechanical engineering. Convert the equations to discreet/digital form.

C. Determine the mass and/or the moment of inertia of the system; use values supplied by the manufacturer or calculate based on drawings or field measurements using standard engineering principles. If the moment of inertia (or mass) varies with speed or with time, introduce this relationship into the equation of motion (e.g., a device that has symmetrical arms that rotate about an axis where the arms rise and fall depending on rotating speed, thus has a variable moment of inertia, but constant mass).

D. If not already available, equip/retrofit the system with proper sensors to measure speed (rotational or linear) and other key variables as needed (e.g., elevation, inclination) for the proper use of equations 3 and 4 or 6 and 7. The sensors will need to provide a digital signal for proper application of the method. Furthermore, for redundancy and verification of data measured, consideration should be given to having more than one sensor for each variable being measured, depending on the criticality and cost/space limitations of the application.

E. Equip/retrofit the system with the capability to store and filter large amounts of data and with the ability to provide an existing control system (on the machine or vehicle) with driving torque, driving force or power efficiency calculations (data) to make appropriate safety, reliability, life extension, performance or energy-saving actions/strategies. (Note: the objectives of the method of the present invention include providing the control system of a rotating machine/vehicle with data related to torque and power to improve the health, life, efficiency of the machine or those who use it; in addition, the objectives include providing the operator of a machine (the driver) with a display showing the driving torque and/or the power generated and/or energy conversion efficiency, so that he can adjust his driving/operating behavior accordingly).

F. If the system is stationary, consider the use of equations 3 and 4, if the system traverses (eg. a vehicle) consider the use of equation 6 and 7. Nevertheless, its for the user to decide since as described earlier, one can convert from linear to angular measurements, and vice-versa; with the added cost related to types of sensing equipment needed, as some skilled in the art can determine.

The practical implementation and use of the method involves the following steps:

1. Develop the relationship between non-conservative forces ($T_{LOSS}$ or $F_{LOSS}$) and speed during natural decay (FIG. 2):
   a. Accelerate the system to a maximum operating speed.
   b. Remove the driving force ($F_{IN}$ or $T_{IN}$) and allow the system to decay due to non-conservative forces. Make note of the operating conditions, such as mass, elevation, temperature, humidity, inclination, under which the natural decay is conducted. If the system involves a vehicle, make note of the terrain or type of tires (e.g., asphalt versus dirt road) and tire pressure at which the natural decay occurs. If gravity (terrain inclination) is a consideration, conduct the natural decay in leveled ground or note the inclination. The impact of gravity (changes in inclination) or of changes in elevation can be included later analytically as mentioned supra.
   c. During step 1b, take rotating or linear speed measurements at a predetermined sampling rate $\Delta t$ and calculate the average speed between measurements ($V_{avg\ or}\ W_{avg}$); do this until the system comes to a complete stop.
   d. Apply equation 3 or 7 to calculate $T_{LOSS}$ or $F_{LOSS}$ and store the values of $T_{LOSS}$ or $F_{LOSS}$ corresponding to the value of average speed in step 1c.
   e. If the sampling rate is introducing too much noise in the data, consider increasing the sampling rate $\Delta t$ and repeat steps 1a to 1d (or apply proper data filtering techniques).
   f. For the data captured in step 1d, use polynomial regression (FIG. 8) to develop a decay curve, or simply store the data in a table, in which case, use linear interpolation to estimate values $T_{LOSS}$ or $F_{LOSS}$ for speeds that fall between the values of speed captured in the table.
   g. Repeat steps 1a to 1f until the results in step 1f do not vary or have statistical significance for a given set of operating conditions.
   h. Repeat steps 1a to 1g for different operating conditions of the system and create a library of natural decay curves for the system. Each curve will estimate different values of $T_{LOSS}$ or $F_{LOSS}$ corresponding to different operating conditions Once in use, the user, or control system, selects the operating conditions to extract the proper values of $T_{LOSS}$ or $F_{LOSS}$. Since machines degrade over time, it may be necessary to recalibrate or repeat these curves after a certain amount of wear and tear, a predetermined number of operating cycles, operating hours, fatigue life, etc. These curves can be provided by the manufacturer of the rotating equipment or performed by the user for as long as the equipment has been fitted to do so.

i. Finally, the natural decay curves can be used as a health signature of the machine/system in question. To this end, as determined by the manufacturer or user of the equipment, a new set of natural decay curves need to be produced and compared to the ones that were produced when the equipment was produced or first used (this implies repeating steps 1a to 1h every so many months or years or after a predetermined set of operating hours). The operator or manufacturer can then compare how the curve has degraded or shifted over time. If the shift is significant, it may provide unique insights into possible future failures or wear, and thus enable predictive maintenance. This will depend on the type of equipment, its use, the quality of its maintenance and expected service life, and how much historical data (natural decay curves) is available.

2. Calculate the driving torque or force ($T_{IN}$ or $F_{IN}$) according to equations 4 or 6:

a. Note the operating conditions of the rotating machine/system. Select the appropriate decay curve(s) from the library in step 1g and make any linear corrections as needed, for example, if the mass of the rotating machine increased, then the decay curve must be adjusted accordingly using linear superposition. Similar corrections may be needed for changes in elevation and inclination in case the terrain conditions have changed. For example, a vehicle using snow tires versus summer tires will experience different friction coefficients, and, therefore the appropriate correction must be made to the natural decay curve in step 1g or a new curve must be generated and stored in step 1g.

b. During the normal operation of the machine, take rotating or linear speed measurements at a predetermined sampling rate $\Delta t$ and calculate the average speed between measurements ($V_{avg}$ or $W_{avg}$). If inclination and/or elevation are relevant to the machine in question, then those measurements should also be taken.

c. If the sampling rate is introducing too much noise in the data, consider increasing the sampling rate $\Delta t$ (or apply filtering techniques mentioned supra) and repeat steps 2a to 2b.

d. For the average speeds ($V_{avg}$ or $W_{avg}$) determined in step 2b, extract the corresponding values of $F_{LOSS}$ or $T_{LOSS}$ from the decay curves from step 1.

e. Take the values of $F_{LOSS}$ or $T_{LOSS}$ from step 2d and use them as input to calculate $T_{IN}$ or $F_{IN}$ in equations 4 or 6. Store the values of driving force or driving torque $T_{IN}$ or $F_{IN}$.

f. Take the value of $T_{IN}$ (or $F_{IN}$) from step 2e and the value of $W_{avg}$ (or $V_{avg}$) from step 2b and multiply them to obtain the power of the power source.

g. Take the value of $T_{LOSS}$ (or $F_{LOSS}$) from step 2d and the value of $W_{avg}$ (or $V_{avg}$) from step 2b and multiply them to obtain the power of the power sink.

h. Calculate efficiency as: N=(Power of Source-Power of Sink)/Power of Source. Store the values of efficiency.

To better describe the use of equations 5 and 6, a series of examples follow:

Example 1 (Bicycle)

Suppose we wanted to measure the power exerted by a cyclist. Companies make power transducers for bicycles (e.g. Shimano) at a cost of about $300-$1000; these devices add about 1 kg of weight to the bicycle and are basically a force transducer and tachometer combination. As an alternative, the cyclist can use the same smart phone he is using to navigate as a power meter. Because a bicycle traverses, gravity and elevation (changes in drag due to changes in air density) are important factors, particularly gravity. To start, his smart phone would be equipped with software (an App) that can process the steps outlined earlier, which constitutes the method of the present invention. The app could incorporate natural decay curves provided by the bicycle manufacturer, or the user can create his own by following the procedure above, which would need to be adjusted for the weight of the cyclist (and bicycle), road type, and perhaps some specific types of tires or pressure in the tires. The smart phone can measure inclination, so the gravity factor $F_G$, in equation 6 can be estimated as the component of the weight of the vehicle (sum of the rider and the bicycle) that is in the direction of travel. Either equation 4 or equation 6 can be used, but equation 6 is selected, since the smart phone can take linear speed measurements (GPS enabled) and, by following steps 1 and 2 above, we can estimate $F_{IN}$ and $F_{LOSS}$ at different linear speeds $V_{avg}$, measured on a real time basis, which, by multiplying $F_{IN}$ by $V_{avg}$, we obtain the power of the source, in this case the cyclist. By using equation 6 versus equation 5, we avoid having to measure the rotating speed of the pedals in order to calculate the power supplied by the cyclist. The cyclist can also measure the efficiency of the bicycle as outlined above. This will allow him to make changes in equipment to reduce friction and drag (which implies a new natural decay curve) and, ultimately, improve performance.

Example 2 (Motorcycle)

This is similar to the example of the bicycle, except that, in a motor vehicle, it is of interest to measure the driving torque, in addition to the power of the source and the efficiency of the vehicle. In this case, equation 6 is also applicable; as is the case of the bicycle, we can also determine the power of the source, in this case, the power output of the motorcycle engine. To measure the torque delivered by the engine, we would need to know the rotational speed of the engine; fortunately, OEM's already measure the rotational speed of the engine, and it's a matter of how to capture this measurement if a smart phone app is being used. One option is to extract a digital signal from the tachometer on the motorcycle and feed it into the smart phone via blue tooth or via an available port in the smart phone so it acts as input to calculate the torque delivered by the engine $T_{IN}$. In this case, $T_{IN}$ equals the power of the source ($F_{IN}$ multiplied by $V_{avg}$) divided by the rotational speed of the engine, taken directly from the tachometer on the motorcycle. Alternatively, the manufacturer of the motorcycle can equip the vehicle with software to perform the calculations needed to execute the method of the present invention and, for the first time ever, to be able to provide the user/operator with torque information. Torque information has significant value, since it is a key driver of wear and fatigue on an engine, and it can provide users (drivers) and manufacturers with recommendations on how to extend the life of an engine or to evaluate the current state (health) of an engine, along with its intrinsic economic value. In the case of motor vehicles, in general, they already measure the linear speed of the vehicle and the rotational speed of the engine; what are missing are sensors to measure the inclination of the terrain and, in certain cases, elevation in order to correct natural decay curves accordingly. Finally, when developing the natural decay curves for motor vehicles, in general, it is best to do so for each gear in the transmission. In other words, accelerate the vehicle to the desired maximum operating speed for each gear and then release the accelerator "fuel pedal or knob" and allow the vehicle to come to a complete stop while taking speed measurements during the process. When the vehicle is in "neutral gear", we are basically decoupling the engine from the transmission, and the natural decay curve resulting from linear speed measurements while in neutral measures the non-conservative forces acting on the chassis of the vehicle. Further, if we want to isolate the engine and determine its natural decay curve due to non-conservative forces within the engine, we would accelerate the engine to a desired speed (rpm), release the gas pedal, and, while the transmission is in neutral (i.e., no load on the engine), we would take rotating speed measurements to develop the natural decay curve of the engine; the moment of inertia of the engine itself would be used in these calculations. In the case of automatic transmissions, it is important to track the gear the vehicle is in (most vehicles are already equipped to do so today), so that the correct natural decay curve is applied in the calculations.

Example 3 (Automobiles and Other Motor Vehicles)

The use and benefits of the present invention when applied to automobiles, buses and trucks would be very similar to that of motorcycles. In the case of commercial vehicles, torque information is of increasing importance in order to maintain adequate reliability, emissions and fuel efficiency of the fleet. The method of the present invention would provide manufacturers with the ability to add gauges (similar to existing tachometer gauges) to display the real-time torque (along with power and energy efficiency) in all types of motor vehicles and to store/retrieve this information in order to make health assessments and maintenance/repair decisions.

Example 4 (Wind Turbines)

In the case of a wind turbine, the source of power is the wind. The power of the wind can be estimated using standard engineering methods. By using the method of the present invention, we can finally determine the mechanical efficiency of the rotor; since we can now calculate the torque on the shaft of the turbine. It is a matter of selecting the right control volume for the energy analysis. In the past, the torque of the turbine was estimated by measuring the electrical power out of the generator and by assuming a certain amount of energy losses in the generator. With the method of the present invention, a more precise method can be used, and manufacturers and operators can now compare the energy conversion efficiency of different rotors and drive trains. Furthermore, by using the method of the present invention, the natural decay curve generated in step 1g can be used as a health signature for the machine; how the curve shifts over time will provide insights into wear or degradation in components and, thus, enable predictive maintenance of the device. In order to generate the natural decay curve of a wind turbine, the turbine must be accelerated to its maximum operating speed in a particular location (assuming there is enough wind speed to do so). The wind turbine then needs to be "feathered", which means yawed to a position where the rotor shaft is perpendicular to the wind; this will allow the rotor to spin freely until it comes to a complete stop.

Example 5 (Pump)

In the case of a pump, such as one driven by an electric motor, the pump will typically be operating at fixed speeds. In the case of fixed-speed operation, the method of the present invention can be used to show how the natural decay curves of the pump change over time to enable predictive maintenance of bearings, impellers (if of centrifugal type), and of the shaft seals. In this case, the operating conditions of the pump (depends on the pump type) include the type of fluid (viscosity, density, etc.) and whether the pump is self-primed. To develop the natural decay curve for the pump, the pump is accelerated in its normal operating conditions, and then the motor is turned off and speed measurements are taken according to the method outlined above. Furthermore, if the pump is equipped with a variable frequency drive so its speed can be varied, or if it can be fitted with a gear box or belt/pulley drive to change its rotating speed, the method of the present invention can be used to determine the speed at which it can achieve its peak efficiency.

Example 6 (Kinetic Energy Storage Device—Flywheel)

In the case of a flywheel energy storage device, particularly one used for peaking applications or frequency regulation, it becomes imperative to be able to calculate the round-trip efficiency (RTE) of the device. The typical way this is done is to measure the ratio of the electrical energy extracted from the system (incremental sum of Voltage times Current leaving) by the electrical energy supplied to the system (incremental sum of Voltage times Current supplied). This is a natural choice, but for this method to work, it requires costly voltage and current meters and filters that extract high quality data in order to perform the calculations. Experience indicates this is limited to a laboratory setting, since significant noise and errors are introduced in both voltage and current measurements at the required sampling rates; consequently, it is common practice to use a torque-meter (an expensive and delicate device) to measure instantaneous power instead. The method of the present invention overcomes these limitations by only taking rotating speed measurements, which narrows the problem to one variable; further, these readings are less noisy and typically easier to filter. To determine the energy supplied to the system, the incremental sum of instantaneous power (the energy into the system) is calculated by the sum of the instantaneous power (the product of torque and rotating speed ie $T_{IN} \times W_{avg}$) multiplied by the sampling rate $\Delta t$ between the time when the system reaches a minimum rotating speed (typically >0) to the time when the system reaches a maximum operating speed. Similarly, the energy extracted by the system is estimated as the incremental sum of the instantaneous power (the product of torque and rotating speed ie $T_{IN} \times W_{avg}$)

multiplied by the sampling rate Δt between the time when the system rotates at the desired/maximum rotating speed to the time when the system reaches a minimum rotating speed (typically >0) plus the energy consumed by the flywheel because of drag or friction while it idled about the desired/target operating speed. This idle energy is calculated in similar form as the instantaneous power (the product of torque and rotating speed, i.e., $T_{IN} \times W_{avg}$) multiplied by the sampling rate Δt between the time when the system starts to idle about the desired/maximum rotating speed to the time when the system is required to delivery the energy it has stored. The calculation of the RTE is somewhat involved and will depend on the application; the method of the present invention greatly facilitates this process. Furthermore, the natural decay curves that form part of the method of the present invention provide the designer of this type of kinetic storage system with the ability to test improved designs, such as the use of vacuum and or magnetic bearings to reduce $T_{LOSS}$ and increase the overall RTE.

Example 7 (Hydro-Turbine)

As is the case of the pump, the method of the present invention would allow the manufacturer and/or operator of a hydro-turbine to use historical natural decay curves to make health and maintenance/repair strategies and decisions. The method also enables the operator to determine the torque generated by the turbine and, therefore, the mechanical power generated by the turbine, which, when compared to the power (or energy) of the water entering the turbine, would then indicate the efficiency of the turbine itself and the speed at which its conversion efficiency is peaked, so the right electrical generator can be used.

DESCRIPTION OF THE PREFERRED EMBODIMENT

The present invention is to be used as a method to measure and manage torque and efficiency in rotating equipment, including turbo machinery. The method can be used as an input or as an upgrade to a control system of existing machines or as an improved and integral part of control systems for new rotating machinery installations. The method relies on the discrete application of the equations of motion of the machine, the measurement of, at least, the rotating or linear speed of the machine, the development and storage of the natural decay curves of the machine at specific speeds in normal operating conditions, and, in certain circumstances, as described earlier, the measurement of the inclination or altitude of the machine, when such factors need to be used to correct the equations of motion for the effects of gravity or air density, respectively. Furthermore, the method can be used to create a history of the mechanical loads (torque) the machine was subjected to in order to make safety, reliability, performance or maintenance decisions and to take appropriate actions.

Figure 1:
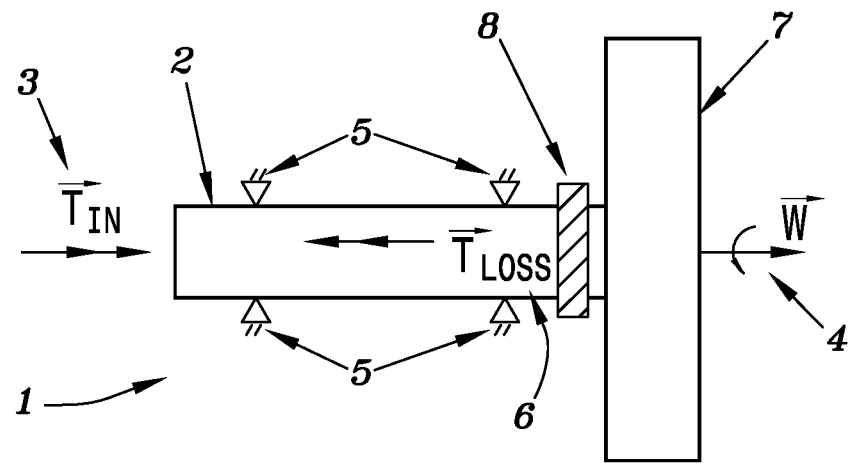
FIG. 1 is a free body diagram showing a rotating shaft driven by a power source and subject to a load of a power sink.

FIG. 1 is a free body diagram showing the basic schematic of a rotating machine 1, composed of a shaft 2, where shaft 2 is driven by an input torque $T_{IN}$ 3 (prime mover, power source or external energy source) and rotates at a rotational speed W 4. The shaft 2 is supported by bearings 5 and is subject to a load $T_{LOSS}$ 6 (power sink). The machine 1 has a moment of inertia 7 that includes all the elements attached to the shaft 2, and where the shaft 2 may or may not be equipped with a gearbox 8.

Figure 2:
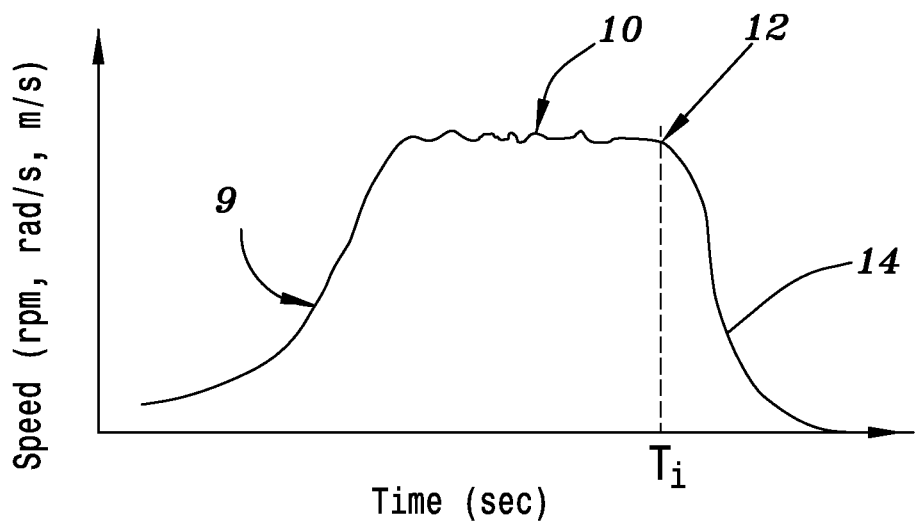
FIG. 2 is a graph showing the natural decay curve of a "typical" rotating machine.

FIG. 2 is a simplified graph showing the basic speed (rotational or linear) versus time curve of a rotating machine, where the initial ramp up is the acceleration phase 9 until the machine reaches a target or maximum operating steady state speed 10 and then, at time $T_i$ 12, the input torque $T_{IN}$ is removed or set to zero, and the machine is allowed to enter natural decay according to the deceleration phase 14, being subject only to load $T_{LOSS}$, until it comes to a complete stop. The capture of natural decay curves is a critical step in the method of present invention (see 50 in FIG. 7). For the method to be accurate, the natural decay curves must be captured at a speed range that includes the expected operating speeds of the machine.

Figure 3:
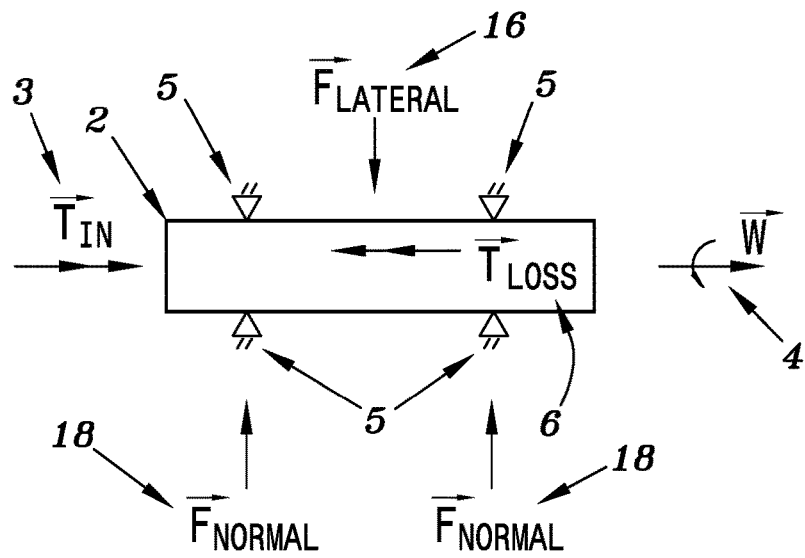
FIG. 3 is a free body diagram showing a rotating shaft subject to a lateral force.

FIG. 3 shows a shaft 2 subjected to a lateral force 16 with corresponding reaction or normal forces 18 on the bearings 5. In the presence of a lateral force(s) 16, the friction in bearings 5 and, therefore, $T_{LOSS}$ 6, will increase. The presence of lateral forces 16 is relevant in cases when the lateral forces vary, since, as mentioned before, it can introduce errors in the method of the present invention. The errors introduced will depend on how much these lateral forces 16 vary and how this variance affects the accuracy of the natural decay curves 14 shown in FIG. 2.

Figure 4:
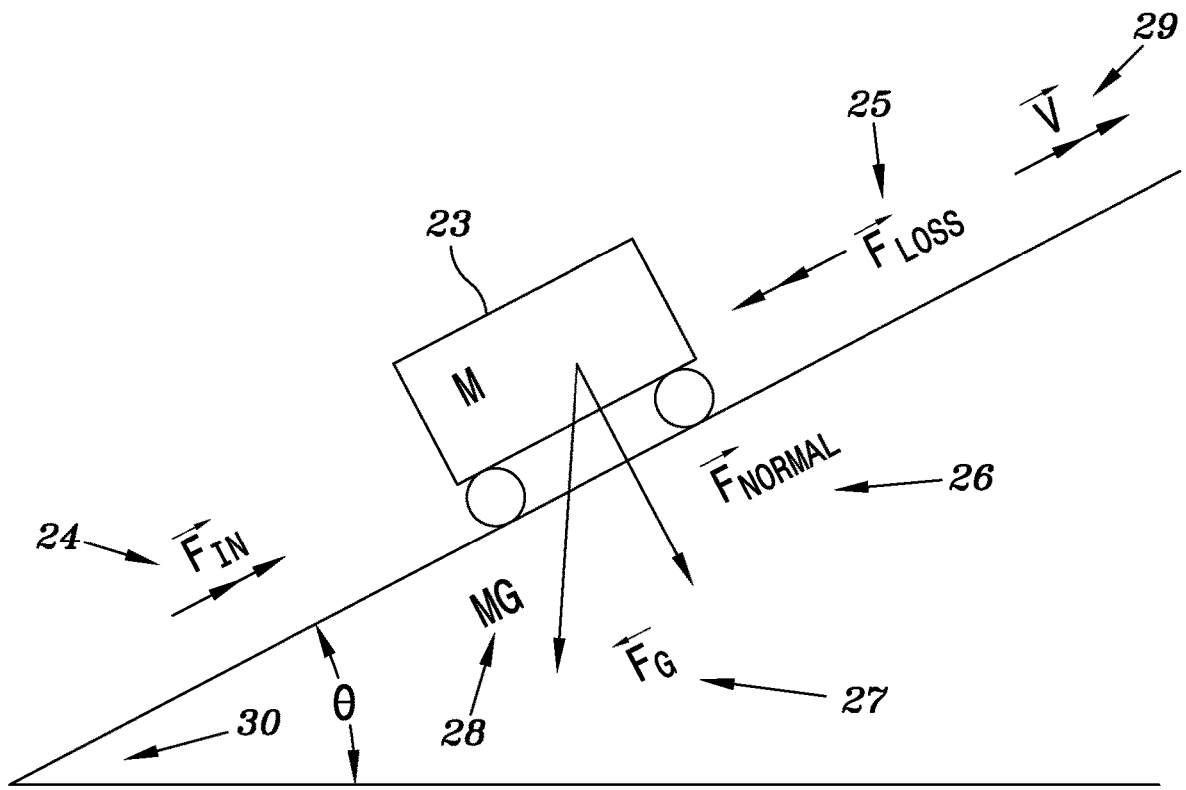
FIG. 4 is a free body diagram showing a motor vehicle traversing on a slope.

FIG. 4 is a free body diagram similar to FIG. 1 supra, but with linear rather than rotational forces, showing a motor vehicle represented by a mass 23, that is driven by a force $F_{IN}$ 24 and subject to a load $F_{LOSS}$ 25 that is composed of friction and drag forces (not shown), where friction is proportional to the friction coefficient between the mass and the road (not shown) and normal force $F_N$ 26, and subject to the force of gravity $F_G$ 27 that is proportional to its weight MG 28 and perpendicular to the normal force $F_N$ 26 and, in the case shown, opposite to the direction being traveled at a speed V 29 over a slope with an angle 30.

Figure 5:
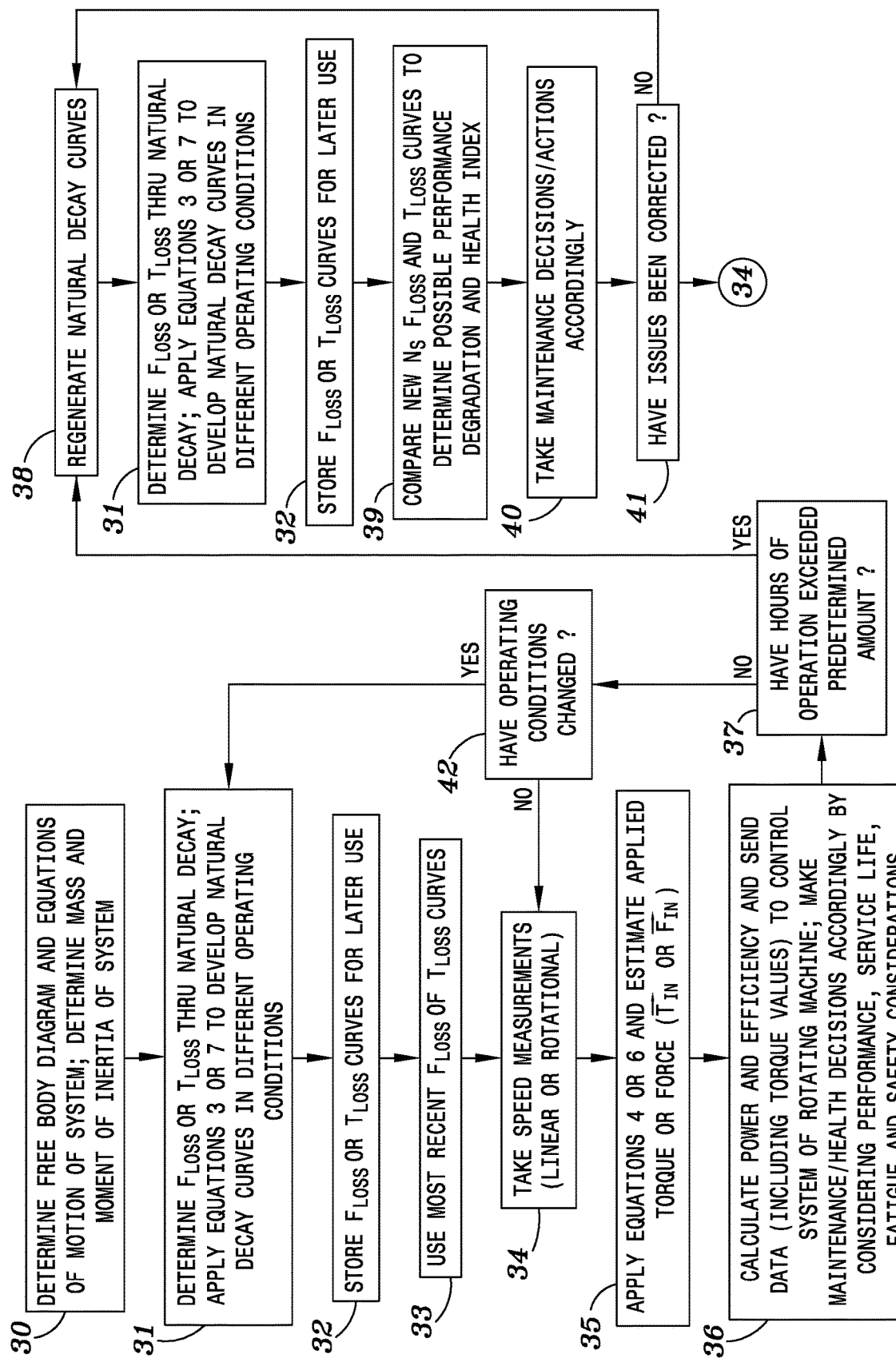
FIG. 5 is a flow diagram showing the steps comprising the method of the present invention.

FIG. 5 is a flow diagram showing the basic steps of the method of the present invention, where Steps 30 through 33 develop and capture the natural decay curves of the machine. Step 34 relates to taking the linear or rotational speed measurements. Steps 35 and 36 estimate applied torque or force by using equations 4 or 6, along with estimated power and efficiency, which is then fed into the control system of the rotating machine or is used to make maintenance, performance, or safety-related decisions. Steps 37 through 41 compare current versus previous natural decay curves to determine if significant changes have occurred that could indicate health issues for the machine to make maintenance or safety decisions or actions. Step 42 relates to the actions that need to be taken if the operating conditions have changed to the point where the natural decay curves need to be regenerated in order for the method to remain accurate and effective.

Figure 6:
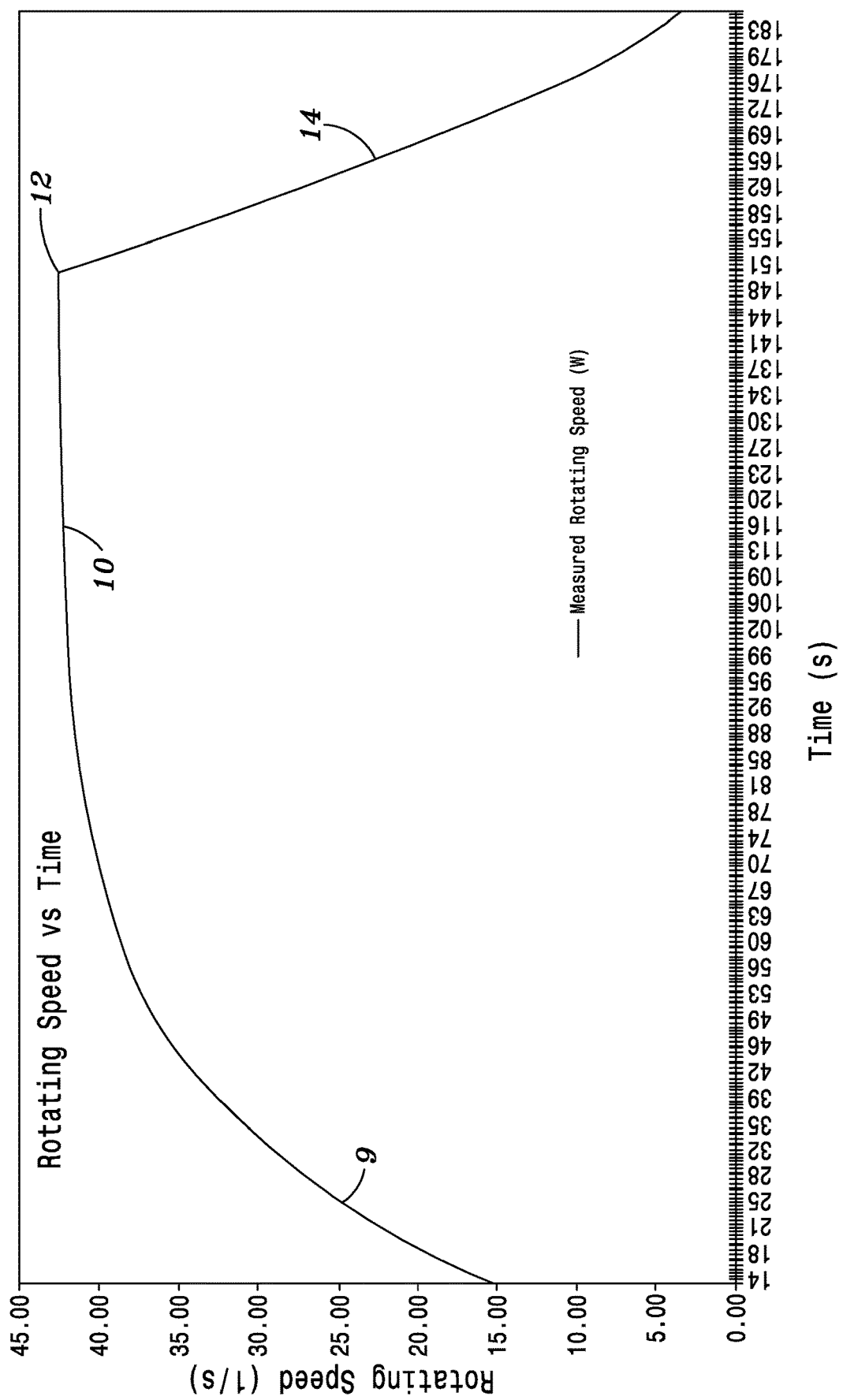
FIGS. 6, 7 and 8 are graphs that show experimental results when the method of the present invention is applied to a rotating machine to estimate the driving torque according to Equation 4 and comparing it to the values measured with a. torque-meter.
Figure 7:
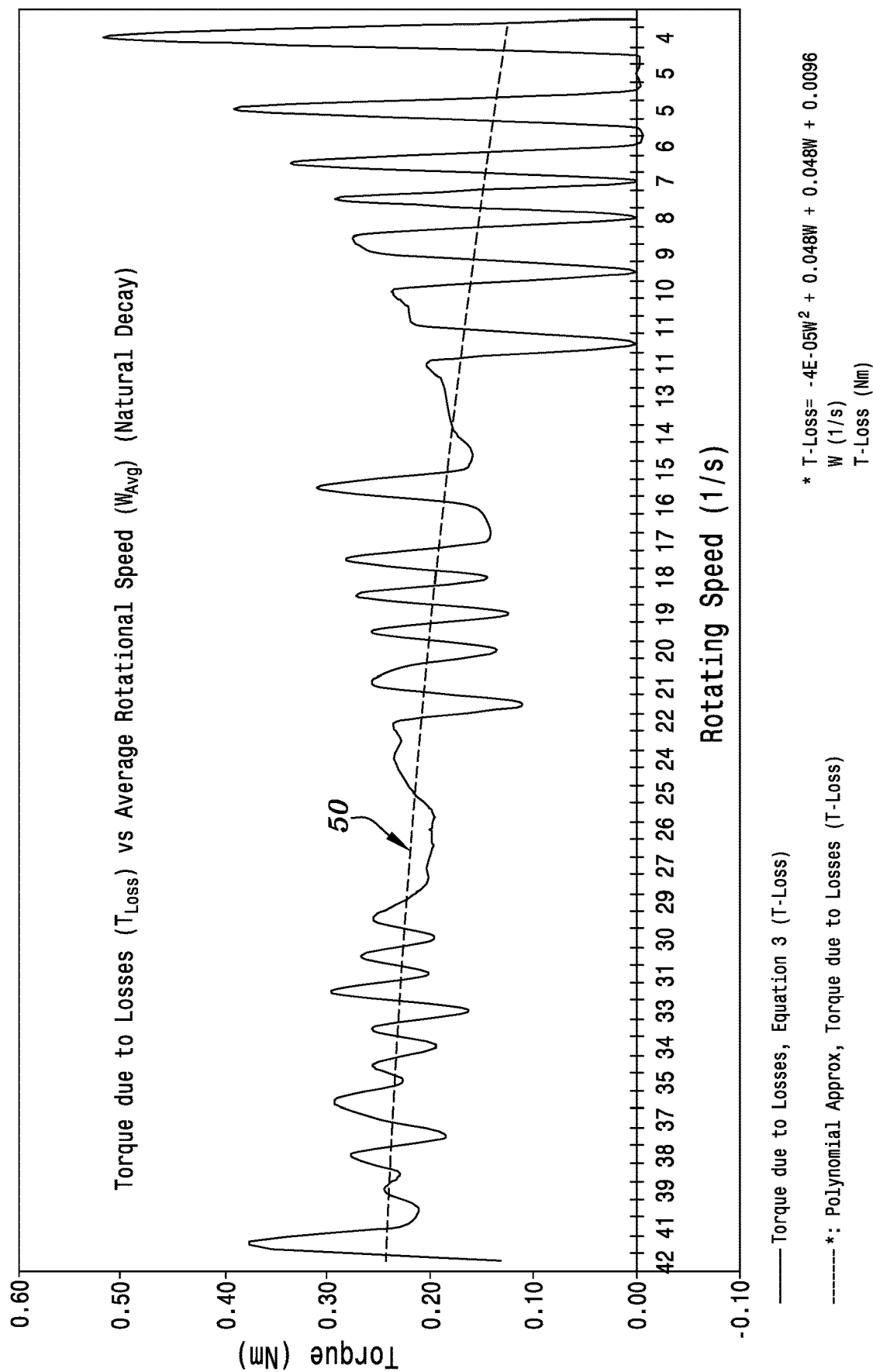
Figure 8:
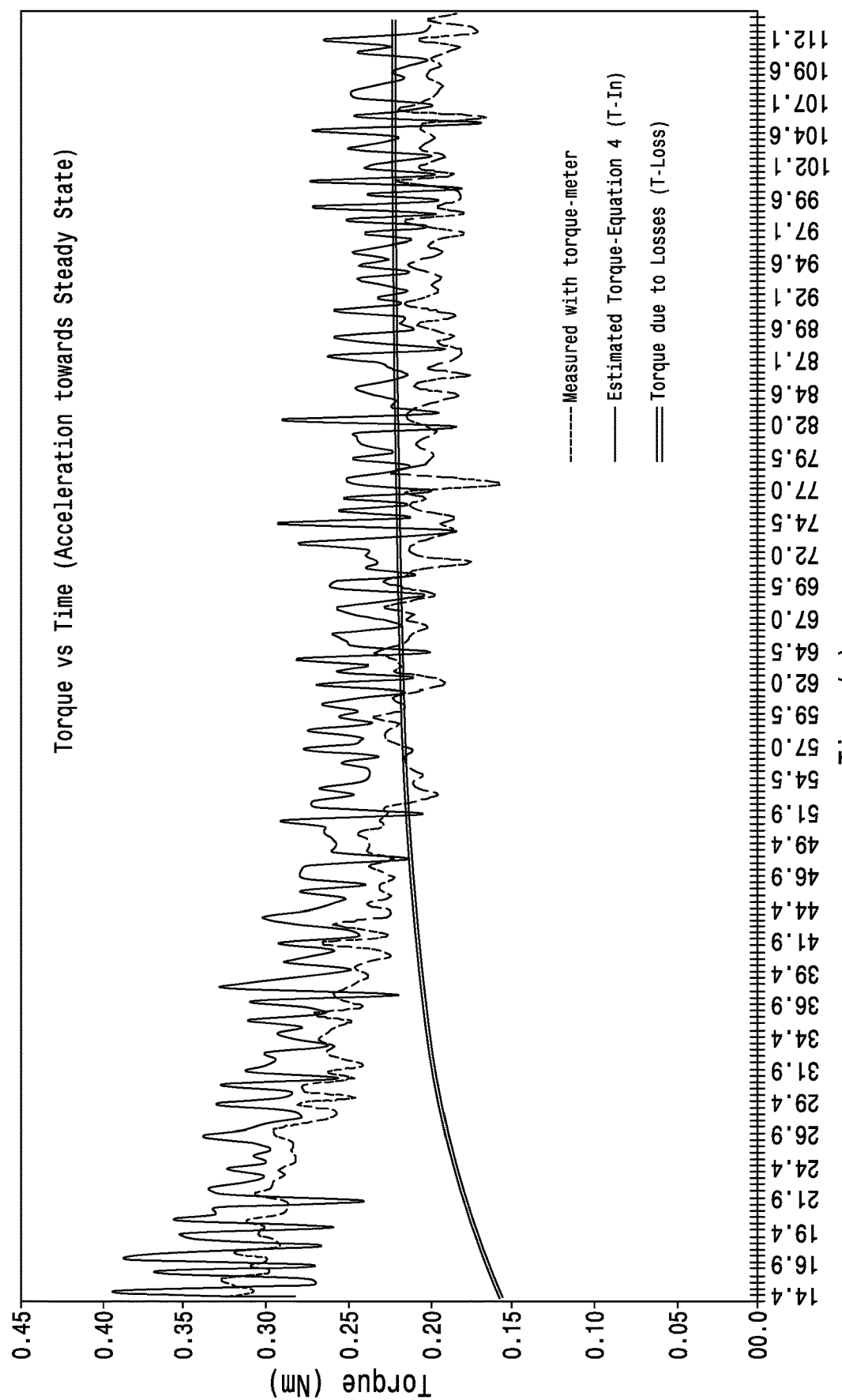

FIGS. 6, 7 and 8 show experimental results that compare the results of estimating torque by applying the method of the present invention to the values obtained from measurements from a torque meter. The experiment consisted of a rotating device consisting of a vertical shaft connected to a torque meter and an electric motor, having fixed arms, symmetrically placed about the shaft. Subsequently, the rotating device was placed in motion, and the method of the present invention was used to estimate torque, and these results were compared to the measurements from the torque meter. As noted in the tables, the moment of inertia 7 of the rotating device equaled 0.175 kg/m² and a sampling rate Δt of 0.5 seconds.

FIG. 6 shows the rotating speed vs. time curve of the rotating device, which is obtained using the experimental results shown in Table 1.

TABLE 1

EXPERIMENTAL RESULTS; NATURAL DECAY CURVE, DETERMINE T-LOSS (Wavg)

| 0.) Item | 1.) Time (ms) | 2.) Time (s) | 3.) Delta Time (s) | 4.) Speed/ W (rpm) | 5.) Speed/ W (1/s) | 6.) Average Speed/W-avg (1/s) |
|---|---|---|---|---|---|---|
| 1 | 14404 | 14.404 | | 145.76 | 15.2638 | |
| 2 | 14909 | 14.909 | 0.505 | 156.57 | 16.40 | 15.83 |
| 12 | 19913 | 19.913 | 0.501 | 198.89 | 20.83 | 20.59 |
| 22 | 24919 | 24.919 | 0.501 | 235.66 | 24.68 | 24.51 |
| 32 | 29928 | 29.928 | 0.502 | 267.34 | 28.00 | 27.86 |
| 42 | 34931 | 34.931 | 0.501 | 294.18 | 30.81 | 30.72 |
| 52 | 39936 | 39.936 | 0.500 | 316.90 | 33.19 | 33.04 |
| 62 | 44943 | 44.943 | 0.502 | 334.23 | 35.00 | 34.87 |
| 72 | 49946 | 49.946 | 0.500 | 347.95 | 36.44 | 36.37 |
| 82 | 54952 | 54.952 | 0.500 | 360.54 | 37.76 | 37.68 |
| 92 | 59959 | 59.959 | 0.505 | 369.31 | 38.67 | 38.65 |
| 102 | 64962 | 64.962 | 0.500 | 377.63 | 39.55 | 39.46 |
| 112 | 69967 | 69.967 | 0.500 | 381.95 | 40.00 | 40.02 |
| 121 | 74496 | 74.496 | 0.508 | 387.37 | 40.56 | 40.57 |
| 131 | 79517 | 79.517 | 0.501 | 391.11 | 40.96 | 40.95 |
| 140 | 84071 | 84.071 | 0.500 | 393.90 | 41.25 | 41.28 |
| 151 | 89596 | 89.596 | 0.504 | 396.15 | 41.48 | 41.46 |
| 161 | 94596 | 94.596 | 0.500 | 398.56 | 41.74 | 41.71 |
| 171 | 99600 | 99.600 | 0.501 | 399.70 | 41.86 | 41.89 |
| 181 | 104602 | 104.602 | 0.500 | 401.16 | 42.01 | 41.97 |
| 182 | 105103 | 105.103 | 0.501 | 401.39 | 42.03 | 42.02 |
| 200 | 114113 | 114.113 | 0.501 | 402.75 | 42.18 | 42.21 |
| 216 | 122121 | 122.121 | 0.501 | 404.21 | 42.33 | 42.29 |
| 240 | 134135 | 134.135 | 0.500 | 405.12 | 42.42 | 42.43 |
| 260 | 144146 | 144.146 | 0.500 | 406.42 | 42.56 | 42.58 |
| 271 | 149648 | 149.648 | 0.500 | 407.19 | 42.64 | 42.61 |
| 272 | 150148 | 150.148 | 0.500 | 405.59 | 42.47 | 42.56 |
| 273 | 150648 | 150.648 | 0.500 | 401.97 | 42.09 | 42.28 |
| 276 | 152149 | 152.149 | 0.500 | 379.67 | 39.76 | 40.06 |
| 277 | 152649 | 152.649 | 0.500 | 373.00 | 39.06 | 39.41 |
| 278 | 153150 | 153.150 | 0.501 | 366.69 | 38.40 | 38.73 |
| 280 | 154151 | 154.151 | 0.500 | 354.06 | 37.08 | 37.34 |
| 281 | 154651 | 154.651 | 0.500 | 347.16 | 36.35 | 36.72 |
| 283 | 155653 | 155.653 | 0.501 | 332.96 | 34.87 | 35.19 |
| 284 | 156154 | 156.154 | 0.501 | 325.95 | 34.13 | 34.50 |
| 287 | 157656 | 157.656 | 0.500 | 309.21 | 32.38 | 32.61 |
| 288 | 158156 | 158.156 | 0.500 | 301.12 | 31.53 | 31.96 |
| 289 | 158661 | 158.661 | 0.505 | 295.57 | 30.95 | 31.24 |
| 293 | 160661 | 160.661 | 0.500 | 269.78 | 28.25 | 28.58 |
| 294 | 161161 | 161.161 | 0.500 | 264.23 | 27.67 | 27.96 |
| 297 | 162661 | 162.661 | 0.500 | 247.86 | 25.96 | 26.24 |
| 300 | 164161 | 164.161 | 0.500 | 230.39 | 24.13 | 24.45 |
| 301 | 164661 | 164.661 | 0.500 | 223.98 | 23.46 | 23.79 |
| 303 | 165661 | 165.661 | 0.500 | 211.38 | 22.14 | 22.47 |
| 304 | 166163 | 166.163 | 0.502 | 208.37 | 21.82 | 21.98 |
| 307 | 167664 | 167.664 | 0.500 | 191.50 | 20.05 | 20.25 |
| 308 | 168164 | 168.164 | 0.500 | 184.45 | 19.32 | 19.68 |
| 309 | 168664 | 168.664 | 0.500 | 181.08 | 18.96 | 19.14 |
| 310 | 169165 | 169.165 | 0.501 | 173.67 | 18.19 | 18.57 |
| 311 | 169666 | 169.666 | 0.501 | 169.71 | 17.77 | 17.98 |
| 313 | 170666 | 170.666 | 0.500 | 158.01 | 16.55 | 16.76 |
| 314 | 171166 | 171.166 | 0.500 | 154.07 | 16.13 | 16.34 |
| 315 | 171666 | 171.666 | 0.500 | 149.68 | 15.67 | 15.90 |
| 316 | 172166 | 172.166 | 0.500 | 141.22 | 14.79 | 15.23 |
| 317 | 172666 | 172.666 | 0.500 | 136.62 | 14.31 | 14.55 |
| 319 | 173667 | 173.667 | 0.500 | 127.45 | 13.35 | 13.60 |
| 321 | 174668 | 174.668 | 0.500 | 117.42 | 12.30 | 12.56 |
| 323 | 175669 | 175.669 | 0.500 | 106.75 | 11.18 | 11.47 |
| 325 | 176669 | 176.669 | 0.500 | 100.90 | 10.57 | 10.87 |
| 327 | 177670 | 177.670 | 0.500 | 88.47 | 9.27 | 9.60 |
| 329 | 178671 | 178.671 | 0.501 | 81.65 | 8.55 | 8.91 |

TABLE 1-continued

EXPERIMENTAL RESULTS; NATURAL DECAY CURVE, DETERMINE T-LOSS (Wavg)

| 330 | 179171 | 179.171 | 0.500 | 74.24 | 7.77 | 8.16 |
| 331 | 179674 | 179.674 | 0.503 | 74.24 | 7.77 | 7.77 |
| 333 | 180674 | 180.674 | 0.500 | 66.25 | 6.94 | 6.94 |
| 336 | 182174 | 182.174 | 0.500 | 57.10 | 5.98 | 5.98 |
| 337 | 182677 | 182.677 | 0.503 | 46.35 | 4.85 | 5.42 |
| 338 | 183177 | 183.177 | 0.500 | 46.35 | 4.85 | 4.85 |
| 339 | 183677 | 183.677 | 0.500 | 46.35 | 4.85 | 4.85 |
| 340 | 184177 | 184.177 | 0.500 | 46.35 | 4.85 | 4.85 |
| 341 | 184677 | 184.677 | 0.500 | 32.24 | 3.38 | 4.12 |
| 342 | 185177 | 185.177 | 0.500 | 32.24 | 3.38 | 3.38 |

| 0.) Item | 7.) Angular Acceleration (1/s^2) | 8.) Moment of Inertia/I (kg*m^2) | 9.) Drive Torque/ T-IN | 10.) Torque due to Losses Using Equation 3/ T-Loss (Wavg) (Nm) | 11.) Current State |
|---|---|---|---|---|---|
| 1 |  | 0.17513 | >0 | N/A | Accelerating |
| 2 | 2.24 | 0.17513 | >0 | N/A | Accelerating |
| 12 | 0.96 | 0.17513 | >0 | N/A | Accelerating |
| 22 | 0.67 | 0.17513 | >0 | N/A | Accelerating |
| 32 | 0.53 | 0.17513 | >0 | N/A | Accelerating |
| 42 | 0.35 | 0.17513 | >0 | N/A | Accelerating |
| 52 | 0.58 | 0.17513 | >0 | N/A | Accelerating |
| 62 | 0.53 | 0.17513 | >0 | N/A | Accelerating |
| 72 | 0.27 | 0.17513 | >0 | N/A | Accelerating |
| 82 | 0.30 | 0.17513 | >0 | N/A | Accelerating |
| 92 | 0.11 | 0.17513 | >0 | N/A | Accelerating |
| 102 | 0.36 | 0.17513 | >0 | N/A | Accelerating |
| 112 | −0.08 | 0.17513 | >0 | N/A | Accelerating |
| 121 | −0.03 | 0.17513 | >0 | N/A | Accelerating |
| 131 | 0.04 | 0.17513 | >0 | N/A | Accelerating |
| 140 | −0.13 | 0.17513 | >0 | N/A | Accelerating |
| 151 | 0.08 | 0.17513 | >0 | N/A | Accelerating |
| 161 | 0.13 | 0.17513 | >0 | N/A | Accelerating |
| 171 | −0.14 | 0.17513 | >0 | N/A | Accelerating |
| 181 | 0.16 | 0.17513 | >0 | N/A | Accelerating |
| 182 | 0.05 | 0.17513 | >0 | N/A | Steady State |
| 200 | −0.12 | 0.17513 | >0 | N/A | Steady State |
| 216 | 0.15 | 0.17513 | >0 | N/A | Steady State |
| 240 | −0.03 | 0.17513 | >0 | N/A | Steady State |
| 260 | −0.09 | 0.17513 | >0 | N/A | Steady State |
| 271 | 0.14 | 0.17513 | >0 | N/A | Steady State |
| 272 | −0.34 | 0.17513 | =0 | 0.059 | Natural Decay |
| 273 | −0.76 | 0.17513 | =0 | 0.133 | Natural Decay |
| 276 | −1.21 | 0.17513 | =0 | 0.211 | Natural Decay |
| 277 | −1.40 | 0.17513 | =0 | 0.245 | Natural Decay |
| 278 | −1.32 | 0.17513 | =0 | 0.231 | Natural Decay |
| 280 | −1.06 | 0.17513 | =0 | 0.185 | Natural Decay |
| 281 | −1.44 | 0.17513 | =0 | 0.253 | Natural Decay |
| 283 | −1.29 | 0.17513 | =0 | 0.226 | Natural Decay |
| 284 | −1.47 | 0.17513 | =0 | 0.257 | Natural Decay |
| 287 | −0.93 | 0.17513 | =0 | 0.163 | Natural Decay |
| 288 | −1.69 | 0.17513 | =0 | 0.297 | Natural Decay |
| 289 | −1.15 | 0.17513 | =0 | 0.202 | Natural Decay |
| 293 | −1.30 | 0.17513 | =0 | 0.228 | Natural Decay |
| 294 | −1.16 | 0.17513 | =0 | 0.204 | Natural Decay |
| 297 | −1.14 | 0.17513 | =0 | 0.200 | Natural Decay |
| 300 | −1.30 | 0.17513 | =0 | 0.227 | Natural Decay |
| 301 | −1.34 | 0.17513 | =0 | 0.235 | Natural Decay |
| 303 | −1.34 | 0.17513 | =0 | 0.234 | Natural Decay |
| 304 | −0.63 | 0.17513 | =0 | 0.110 | Natural Decay |
| 307 | −0.78 | 0.17513 | =0 | 0.136 | Natural Decay |
| 308 | −1.48 | 0.17513 | =0 | 0.259 | Natural Decay |
| 309 | −0.71 | 0.17513 | =0 | 0.124 | Natural Decay |
| 310 | −1.55 | 0.17513 | =0 | 0.271 | Natural Decay |
| 311 | −0.83 | 0.17513 | =0 | 0.145 | Natural Decay |
| 313 | −0.84 | 0.17513 | =0 | 0.147 | Natural Decay |
| 314 | −0.83 | 0.17513 | =0 | 0.145 | Natural Decay |
| 315 | −0.92 | 0.17513 | =0 | 0.161 | Natural Decay |
| 316 | −1.77 | 0.17513 | =0 | 0.310 | Natural Decay |
| 317 | −0.96 | 0.17513 | =0 | 0.169 | Natural Decay |
| 319 | −1.00 | 0.17513 | =0 | 0.176 | Natural Decay |
| 321 | −1.06 | 0.17513 | =0 | 0.185 | Natural Decay |
| 323 | −1.15 | 0.17513 | =0 | 0.201 | Natural Decay |

TABLE 1-continued

EXPERIMENTAL RESULTS; NATURAL DECAY CURVE, DETERMINE T-LOSS (Wavg)

| | | | | | |
|---|---|---|---|---|---|
| 325 | −1.22 | 0.17513 | =0 | 0.214 | Natural Decay |
| 327 | −1.34 | 0.17513 | =0 | 0.234 | Natural Decay |
| 329 | −1.43 | 0.17513 | =0 | 0.250 | Natural Decay |
| 330 | −1.55 | 0.17513 | =0 | 0.272 | Natural Decay |
| 331 | 0.00 | 0.17513 | =0 | 0.000 | Natural Decay |
| 333 | 0.00 | 0.17513 | =0 | 0.000 | Natural Decay |
| 336 | 0.00 | 0.17513 | =0 | 0.000 | Natural Decay |
| 337 | −2.24 | 0.17513 | =0 | 0.392 | Natural Decay |
| 338 | 0.00 | 0.17513 | =0 | 0.000 | Natural Decay |
| 339 | 0.00 | 0.17513 | =0 | 0.000 | Natural Decay |
| 340 | 0.00 | 0.17513 | =0 | 0.000 | Natural Decay |
| 341 | −2.96 | 0.17513 | =0 | 0.518 | Natural Decay |
| 342 | 0.00 | 0.17513 | =0 | 0.000 | Natural Decay |

The curve depicts the behavior of the device during the acceleration phase 9, steady state phase 10, and natural decay, or deceleration phase 14 of the rotating device, as defined supra in FIG. 2. The experiment is performed by accelerating the device to a rotating speed of ~42 Hz. It then reaches a steady state, in which the input torque from the electric motor $T_{IN}$ equals the $T_{LOSS}$ from the losses. In the experiment, the steady state is maintained for ~45 seconds and then the electric motor is turned off at time 12, implying that $T_{IN}$ equals zero, and the rotating device enters natural decay 14, according to Equation 4. Real time rotating speed measurements W (Hz) are captured using a digital tachometer, from which the average speed $W_{AVG}$ (Hz) (used in FIG. 7) and the angular acceleration (1/s²) (used in Equations 3 and 4) are calculated, respectively. In column 7 in Table 1, the angular acceleration (1/s²) is also captured. During natural decay, by applying Equation 4, $T_{LOSS}$ is calculated as per the method of the present invention and included in column 10.

FIG. 7 shows how, by applying equation 8 of the present invention, the relationship between $T_{LOSS}$ and average rotating speed is obtained and approximated with the use of a polynomial function 50. In Table 2, the values of $W_{AVG}$ and $T_{LOSS}$ (columns 6 and 10 in Table 1) are sorted from low to high.

TABLE 2

EXPERIMENTAL RESULTS,
DETERMINE T-Loss =
Function (Wavg)

| 6.) Average Speed/W-avg (Vs) | 10.) Torque due to Losses - Using Equation 3/ T-Loss (Wavg) (Nm) | 12.) Polynomial approx-imation* ==> T-Loss (Wavg) (Nm) |
|---|---|---|
| 3.3764 | 0.000 | 0.1064 |
| 4.1152 | 0.518 | 0.1097 |
| 9.2650 | 0.000 | 0.1316 |
| 14.0775 | 0.160 | 0.1502 |
| 19.1391 | 0.124 | 0.1678 |
| 24.4508 | 0.227 | 0.1841 |
| 29.2658 | 0.255 | 0.1968 |
| 33.8566 | 0.193 | 0.2073 |
| 38.7299 | 0.231 | 0.2165 |
| 39.4092 | 0.245 | 0.2176 |
| 40.0598 | 0.211 | 0.2187 |
| 40.6871 | 0.228 | 0.2197 |
| 41.5536 | 0.379 | 0.2210 |
| 42.2835 | 0.133 | 0.2220 |

The data is sorted in this way in order to be able to use numerical methods to create a second order polynomial approximation 50 of the data. It is worth noting how, as the device slows down and speed is less than 22 Hz, the method of the present invention reflects large swings (particularly when speed is less than 11 Hz) in torque values estimated, as the friction in the bearings starts to transition between kinetic and static values. The resulting polynomial 50 is $T_{LOSS}=-4E-05\ W_{AVG}^2+0.0048\ W_{AVG}+0.0906$ (in Nm) and the results are included in FIG. 7 and in column 12 in Table 2. The use of a polynomial 50 to estimate $T_{LOSS}$ helps to filter noise in the measurements of $T_{LOSS}$ in Table 1; this polynomial 50 captures the natural decay curve of the rotating device used in the experiment. Alternatively, columns 6 and 10 in Table 2 can be used as the natural decay curve by using linear interpolation to extract a value for $T_{LOSS}$ for a given value of $W_{AVG}$.

In FIG. 8, the data taken during the acceleration phase (9 in FIG. 2) up to when the system enters steady state (10 in FIG. 1), (time ~112 s), together with the polynomial estimate of $T_{LOSS}$ (column 12 of Table 3) (50 in FIG. 7), are used to estimate the drive torque $T_{IN}$ (column 13) according to Equation 3 and compared to the readings from the torque meter (column 14).

TABLE 3

EXPERIMENTAL RESULTS

| Item | 1.) Time (ms) | 2.) Time (s) | 3.) Delta Time (s) | 4.) Speed/ W (rpm) | 5.) Speed/ W (1/s) | 6.) Average Speed/W-avg (1/s) |
|---|---|---|---|---|---|---|
| 1 | 14404 | 14.404 |  | 145.76 | 15.2638 |  |
| 2 | 14909 | 14.909 | 0.505 | 156.57 | 16.40 | 15.83 |
| 3 | 15409 | 15.409 | 0.500 | 159.91 | 16.75 | 16.57 |
| 4 | 15909 | 15.909 | 0.500 | 166.27 | 17.41 | 17.08 |
| 17 | 22416 | 22.416 | 0.500 | 219.17 | 22.95 | 22.73 |
| 29 | 28426 | 28.426 | 0.500 | 259.51 | 27.18 | 27.00 |
| 39 | 33429 | 33.429 | 0.500 | 287.14 | 30.07 | 29.92 |
| 49 | 38435 | 38.435 | 0.500 | 310.46 | 32.51 | 32.36 |
| 60 | 43940 | 43.940 | 0.500 | 329.63 | 34.52 | 34.46 |
| 70 | 48946 | 48.946 | 0.500 | 346.66 | 36.30 | 36.21 |
| 81 | 54452 | 54.452 | 0.500 | 359.09 | 37.60 | 37.56 |
| 91 | 59454 | 59.454 | 0.500 | 368.78 | 38.62 | 38.53 |
| 102 | 64962 | 64.962 | 0.500 | 377.63 | 39.55 | 39.46 |
| 112 | 69967 | 69.967 | 0.500 | 381.95 | 40.00 | 40.02 |
| 122 | 75005 | 75.005 | 0.509 | 386.47 | 40.47 | 40.52 |
| 131 | 79517 | 79.517 | 0.501 | 391.11 | 40.96 | 40.95 |
| 140 | 84071 | 84.071 | 0.500 | 393.90 | 41.25 | 41.28 |
| 149 | 88591 | 88.591 | 0.500 | 396.55 | 41.53 | 41.47 |
| 157 | 92596 | 92.596 | 0.500 | 397.63 | 41.64 | 41.64 |
| 167 | 97597 | 97.597 | 0.500 | 399.62 | 41.85 | 41.86 |
| 179 | 103602 | 103.602 | 0.500 | 400.99 | 41.99 | 41.99 |
| 189 | 108608 | 108.608 | 0.500 | 401.80 | 42.08 | 42.04 |
| 196 | 112111 | 112.111 | 0.500 | 402.51 | 42.15 | 42.12 |
| 200 | 114113 | 114.113 | 0.501 | 402.75 | 42.18 | 42.21 |

| Item | 7.) Angular Acceleration (1/s^2) | 8.) Moment of Inertia/I (kg*m^2) | 11.) Current State | 12.) Polynomial approximation* ==> T-Loss (Wavg) (Nm) | 13.) Torque Estimated with Equation 4; T-in (Nm) | 14.) Torque measured with Torquemeter (Nm) |
|---|---|---|---|---|---|---|
| 1 |  | 0.1751316 | Accelerating | 0.0906 | 0.0906 | 0.32583 |
| 2 | 2.24 | 0.1751316 | Accelerating | 0.1566 | 0.5491 | 0.30718 |
| 3 | 0.70 | 0.1751316 | Accelerating | 0.1592 | 0.2817 | 0.32004 |
| 4 | 1.33 | 0.1751316 | Accelerating | 0.1609 | 0.3943 | 0.32691 |
| 17 | 0.87 | 0.1751316 | Accelerating | 0.1790 | 0.3322 | 0.30675 |
| 29 | 0.71 | 0.1751316 | Accelerating | 0.1910 | 0.3146 | 0.25881 |
| 39 | 0.58 | 0.1751316 | Accelerating | 0.1984 | 0.3001 | 0.26348 |
| 49 | 0.60 | 0.1751316 | Accelerating | 0.2040 | 0.3091 | 0.25060 |
| 60 | 0.23 | 0.1751316 | Accelerating | 0.2085 | 0.2484 | 0.22799 |
| 70 | 0.36 | 0.1751316 | Accelerating | 0.2120 | 0.2752 | 0.23772 |
| 81 | 0.18 | 0.1751316 | Accelerating | 0.2145 | 0.2464 | 0.21097 |
| 91 | 0.34 | 0.1751316 | Accelerating | 0.2162 | 0.2763 | 0.23443 |
| 102 | 0.36 | 0.1751316 | Accelerating | 0.2177 | 0.2807 | 0.21964 |
| 112 | −0.08 | 0.1751316 | Accelerating | 0.2186 | 0.2043 | 0.22837 |
| 122 | −0.18 | 0.1751316 | Accelerating | 0.2194 | 0.1871 | 0.18490 |
| 131 | 0.04 | 0:1751316 | Accelerating | 0.2201 | 0.2268 | 0.19900 |
| 140 | −0.13 | 0.1751316 | Accelerating | 0.2206 | 0.1975 | 0.19328 |
| 149 | 0.23 | 0.1751316 | Accelerating | 0.2209 | 0.2608 | 0.19593 |
| 157 | −0.02 | 0.1751316 | Accelerating | 0.2211 | 0.2184 | 0.19498 |
| 167 | −0.05 | 0.1751316 | Accelerating | 0.2214 | 0.2123 | 0.20230 |
| 179 | 0.02 | 0.1751316 | Accelerating | 0.2216 | 0.2253 | 0.20559 |
| 189 | 0.14 | 0.1751316 | Steady State | 0.2217 | 0.2468 | 0.19303 |
| 196 | 0.13 | 0.1751316 | Steady State | 0.2218 | 0.2441 | 0.20718 |
| 200 | −0.12 | 0.1751316 | Steady State | 0.2219 | 0.2003 | 0.18268 |

As can be seen, the values of the two measurements (from column 13 and column 14) are very close to each other. Hundreds of these experiments were performed proving the accuracy of the method of the present invention. It is worth highlighting that the rotating device used in the experiment had a small inertia and relatively low speed. This was done to test the method in an extreme case where non-conservative forces (or torque) were of similar magnitude to inertial forces and, therefore, had the method been error prone or erroneous, the results would not have shown such a good correlation to the torque meter measurements. Arguably, the method of the proposed invention is at least as accurate, if not more accurate, than the measurements from the torque meter; with certainly, it's less costly, light, and space-saving.

I claim:

1. A method for measuring and managing torque and energy efficiency in a rotating machine comprising a rotating shaft having a moment of inertia about its axis of rotation, a bearing connected to the rotating shaft, a power source driving the rotating shaft, and a power sink opposing movement of the rotating shaft, the method comprising:
   A. measuring a rotating speed of the rotating shaft at discrete time intervals;
   B. storing measurements of the rotating speed in electronic form;
   C. using an equation describing the movement of the rotating shaft as follows:

$T_{IN} - T_{LOSS} = T_N = I * dW/dt$ wherein $T_{IN}$ (in Newton*m) is torque from the power source, $T_{LOSS}$, the power sink (in Newton*m), is negative torque due to losses and other sources opposing rotation of the shaft, $T_N$ (in Newton*m) is torque net of sources opposing the rotating shaft, I (kg*m²) is the moment of inertia about the axis of rotation of the shaft, W (Rad/s) is the rotating speed of the shaft, and dW/dt (Rad/s²) represents angular acceleration of the rotating shaft, D. calculating the torque from the power source acting on the shaft, the torque from the power sink, the net torque acting on the shaft, the power consumed by the rotating machine, energy efficiency of the rotating machine, and a health index of the rotating machine in order to determine maintenance and safety actions to be taken, wherein the method further comprises the following steps:
a. determining a target maximum operating speed of the rotating machine;
b. accelerating the rotating machine using the power source;
c. allowing the shaft of the rotating machine to reach the target maximum operating speed;
d. disconnecting the power source;
e. allowing the rotating machine to enter natural decay;
f. taking rotating speed measurements during natural decay at predetermined time intervals;
g. generating and storing a natural decay curve for each operating condition;
h. reconnecting the power source;
i. Operating the rotating machine in conditions consistent with the conditions by which the natural decay curve was developed and stored;
j. taking rotating speed measurements of the rotating shaft;
k. using the equation describing the movement of the rotating shaft for calculating torque of the power source by using the stored natural decay curve to determine $T_{LOSS}$.

2. The method of claim 1, wherein the losses causing negative torque in the equation are selected from friction and drag.

3. The method of claim 1, wherein real-time power of the rotating machine is determined by multiplying $T_{IN}$ by the measured rotating speed.

4. The method of claim 1, wherein a curve depicting natural decay is captured, showing rotating speed plotted against time.

5. The method of claim 1, wherein the predetermined time intervals selected in step f. depend on an application and an ability to filter noise in measured data.

6. The method of claim 1, wherein deceleration of the shaft is calculated during natural decay at different rotating speed values.

7. The method of claim 1, wherein during natural decay, $T_{LOSS}=I*dW/dt$, for different values of rotating speed.

8. The method of claim 1, wherein natural decay data consisting of rotating speed plotted against time is stored as a health signature of the rotating machine.

9. The method of claim 1, wherein the natural decay curve is created by approximating natural decay data with a polynomial or equivalent function.

10. The method of claim 1, wherein efficiency of the rotating machine is determined as: $(T_{IN}-T_{LOSS})/T_{IN}$.

11. The method of claim 1, wherein values of torque, power, and efficiency of the rotating machine are sent as input to a control system governing the rotating machine or are displayed for the operator of the rotating machine in order to adjust its operation.

12. The method of claim 1, wherein, after a predetermined number of hours of operation, the natural decay curve of the rotating machine is recreated and compared to historical natural decay curves in storage.

13. The method of claim 12, wherein, if material differences are found between a recreated natural decay curve and historical natural decay curves, then decisions can be made and actions can be implemented related to safety and maintenance considerations.

14. A method for measuring and managing force and energy efficiency in a traversing machine with linear movement comprising a mass, a power source that propels the machine, and a power sink opposing movement of the machine, the method comprising:
A. measuring a linear speed of the mass at discrete time intervals;
B. storing measurements of the linear speed in electronic form;
C. using an equation describing the movement of the rotating shaft as follows:

$$F_{IN}-F_{LOSS}=F_N=M*dV/dt$$

wherein $F_{IN}$ (in Newton) is force from the power source, $F_{LOSS}$, the power sink (in Newton) is negative force due to losses and other sources opposing movement of the machine, $F_N$ (in Newton) is force net of sources opposing the machine, M (kg) is the mass of the machine, V (m/s) is the linear speed of the machine, and dV/dt (m/s²) represents linear acceleration of the machine, D. calculating the force from the power source acting on the machine, the force from the power sink, the net force acting on the machine, the power consumed by the machine, energy efficiency of the machine, and a health index of the machine in order to determine maintenance and safety actions to be taken, wherein the method further comprises the following steps:
a. determining a target maximum operating speed of the machine;
b. accelerating the machine using the power source;
c. allowing the machine to reach the target maximum operating speed;
d. disconnecting the power source;
e. allowing the machine to enter natural decay;
f. taking linear speed measurements during natural decay at predetermined time intervals;
g. generating and storing a natural decay curve for each operating condition;
h. reconnecting the power source;
i. Operating the machine in conditions consistent with the conditions by which the natural decay curve was developed and stored;
j. taking linear speed measurements of the machine;
k. using the equation describing the movement of the machine for calculating force of the power source by using the stored natural decay curve to determine $F_{LOSS}$.

15. The method of claim 14, wherein the losses causing negative force in the equation are selected from friction and drag.

16. The method of claim 14, wherein real-time power of the machine is determined by multiplying $F_{IN}$ by measured linear speed.

17. The method of claim 14, wherein a curve depicting natural decay is captured, showing linear speed plotted against time.

18. The method of claim 14, wherein the predetermined time intervals selected in step f. depend on an application and an ability to filter noise in measured data.

19. The method of claim 14, wherein deceleration of the machine is calculated during natural decay at different linear speed values.

20. The method of claim 14, wherein during natural decay, $F_{LOSS}=M*dV/dt$, for different values of linear speed.

21. The method of claim 14, wherein natural decay data consisting of linear speed plotted against time is stored as a health signature of the machine.

22. The method of claim 14, wherein the natural decay curve is created by approximating natural decay data with a polynomial or equivalent function.

23. The method of claim 14, wherein efficiency of the machine is determined as: $(F_{IN}-F_{LOSS})/F_N$.

24. The method of claim 14, wherein values of force, power, and efficiency of the machine are sent as input to a control system governing the machine or are displayed for the operator of the machine in order to adjust its operation.

25. The method of claim 14, wherein, after a predetermined number of hours of operation, the natural decay curve of the machine is recreated and compared to historical natural decay curves in storage.

26. The method of claim 25, wherein, if material differences are found between a recreated natural decay curve and historical natural decay curves, then decisions can be made and actions can be implemented related to safety and maintenance considerations.

* * * * *

UNITED STATES PATENT AND TRADEMARK OFFICE
CERTIFICATE OF CORRECTION

PATENT NO. : 10,690,556 B1
APPLICATION NO. : 16/259801
DATED : June 23, 2020
INVENTOR(S) : Mauricio F. Quintana Page 1 of 1

It is certified that error appears in the above-identified patent and that said Letters Patent is hereby corrected as shown below:

In the Claims

Column 28, Line 23 "rotating shaft" should be changed to --traversing machine--.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*